(12) United States Patent
Laidlaw et al.

(10) Patent No.: US 9,628,434 B2
(45) Date of Patent: Apr. 18, 2017

(54) PROGRAMMABLE ELECTRONIC DEVICES ON CONTAINERS

(71) Applicant: Medea Inc., Pleasanton, CA (US)

(72) Inventors: Brandon S. Laidlaw, Pleasanton, CA (US); Margaret L. Taylor, Incline Village, NV (US); Jed Putterman, Mill Valley, CA (US)

(73) Assignee: Medea Inc., Pleasanton, CA (US)

( * ) Notice: Subject to any disclaimer, the term of this patent is extended or adjusted under 35 U.S.C. 154(b) by 0 days.

(21) Appl. No.: 14/670,575

(22) Filed: Mar. 27, 2015

(65) Prior Publication Data
US 2015/0334079 A1 Nov. 19, 2015

Related U.S. Application Data

(60) Provisional application No. 61/993,963, filed on May 15, 2014.

(51) Int. Cl.
*G06Q 30/02* (2012.01)
*H04L 12/58* (2006.01)
(Continued)

(52) U.S. Cl.
CPC ......... *H04L 51/38* (2013.01); *G06Q 30/0251* (2013.01); *G08B 21/18* (2013.01);
(Continued)

(58) Field of Classification Search
CPC ...... G08B 21/182; G08B 21/18; B65D 23/00; B65D 23/006; B65D 2203/10; B65D 2203/00
(Continued)

(56) References Cited

U.S. PATENT DOCUMENTS

| 97,669 | A | 12/1869 | Millen |
| D20,656 | S | 3/1891 | Dawes |

(Continued)

FOREIGN PATENT DOCUMENTS

| JP | 07-027624 | 1/1995 |
| KR | 1020130011352 | 1/2013 |

(Continued)

OTHER PUBLICATIONS

Tech-Recipes, http://www.tech-recipes.com/rx/2484/iphone_change_the_auto_lock_delay/, Jun. 29, 2007.
(Continued)

*Primary Examiner* — Hongmin Fan
(74) *Attorney, Agent, or Firm* — Lowenstein Sandler LLP

(57) ABSTRACT

Systems and methods for sharing resources between multiple processing streams are described. An example method may comprise: receiving data by an electronic display device attached to an object; determining, by the electronic display device, whether the data satisfies a criterion; responsive to determining that the data satisfies the criterion, generating a first message based on the data; wirelessly transmitting the first message to a computing device that is wirelessly connected to the electronic display device; receiving a second message from the computing device; and displaying at least one of the first message or the second message by the electronic display device.

14 Claims, 9 Drawing Sheets

(51) Int. Cl.
*G10L 19/00* (2013.01)
*G10L 17/22* (2013.01)
*G08B 21/18* (2006.01)
*H04W 4/12* (2009.01)
*H04L 29/08* (2006.01)
*H04W 4/02* (2009.01)

(52) U.S. Cl.
CPC .............. *G10L 17/22* (2013.01); *G10L 19/00* (2013.01); *H04L 67/12* (2013.01); *B65D 2203/10* (2013.01); *H04L 67/36* (2013.01); *H04W 4/023* (2013.01); *H04W 4/12* (2013.01)

(58) Field of Classification Search
IPC ............ B65D 23/00,23/006, 2203/10, 2203/00
See application file for complete search history.

(56) References Cited

U.S. PATENT DOCUMENTS

| | | | |
|---|---|---|---|
| D23,100 S | 3/1894 | Fay et al. | |
| 716,793 A | 12/1902 | Vogeler | |
| 823,008 A | 6/1906 | Vendig | |
| 1,262,788 A | 4/1918 | Heidenreich | |
| 1,554,191 A | 9/1925 | Alexander | |
| 1,653,608 A | 3/1927 | Allen | |
| 1,686,354 A | 3/1927 | Wallace | |
| 1,769,147 A | 12/1927 | Benjamin | |
| 1,856,550 A | 12/1928 | Guenard | |
| 1,770,093 A | 2/1929 | West | |
| D79,958 S | 11/1929 | De Wagner | |
| D85,487 S | 7/1931 | Meyer | |
| 3,864,976 A | 2/1975 | Parker | |
| 3,965,590 A | 6/1976 | Algaze | |
| 3,996,879 A | 12/1976 | Walton | |
| 4,607,756 A | 8/1986 | Courtman | |
| D285,903 S | 9/1986 | Courtman | |
| 4,765,465 A | 8/1988 | Yamada et al. | |
| 4,928,412 A | 5/1990 | Nishiyama | |
| D314,308 S | 2/1991 | Cogswell | |
| D317,123 S | 5/1991 | Colani | |
| D318,224 S | 7/1991 | Altobelli | |
| 5,125,866 A | 6/1992 | Arad et al. | |
| 5,168,646 A | 12/1992 | Dippong et al. | |
| 5,201,431 A | 4/1993 | Berger et al. | |
| 5,211,699 A | 5/1993 | Tipton | |
| 5,297,247 A | 3/1994 | Kan | |
| 5,339,548 A | 8/1994 | Russell | |
| 5,347,453 A | 9/1994 | Maestre | |
| 5,379,916 A | 1/1995 | Martindale et al. | |
| 5,553,735 A | 9/1996 | Kimura | |
| 5,575,553 A | 11/1996 | Tipton | |
| 5,678,925 A | 10/1997 | Garmaise et al. | |
| 5,774,876 A | 6/1998 | Woolley et al. | |
| 5,823,346 A | 10/1998 | Weiner | |
| 5,863,752 A | 1/1999 | Court et al. | |
| 5,884,421 A | 3/1999 | Key | |
| 5,992,678 A | 11/1999 | Willey | |
| 6,037,872 A | 3/2000 | Dunnum | |
| 6,062,380 A | 5/2000 | Dorney | |
| 6,084,526 A | 7/2000 | Blotky et al. | |
| 6,158,870 A | 12/2000 | Ramirez | |
| D436,852 S | 1/2001 | Chan | |
| 6,213,616 B1 | 4/2001 | Chien | |
| 6,302,608 B1 | 10/2001 | Holmes et al. | |
| 6,393,401 B1 | 5/2002 | Loudermilk et al. | |
| D470,770 S | 2/2003 | Machado et al. | |
| 6,527,402 B1 | 3/2003 | Borri | |
| D473,469 S | 4/2003 | Claessen | |
| 6,588,131 B2 | 7/2003 | O'Connell, Jr. | |
| 6,588,593 B2 | 7/2003 | Woskoski | |
| 6,747,918 B2 | 6/2004 | Hight et al. | |
| 6,762,734 B2 | 7/2004 | Blotky et al. | |
| 6,872,116 B1 | 3/2005 | Dunnum et al. | |
| 6,923,549 B2 | 8/2005 | Hoy | |
| 6,945,418 B2 | 9/2005 | Guido et al. | |
| 7,000,343 B1 | 2/2006 | Teichman | |
| D521,388 S | 5/2006 | Andoh | |
| D521,389 S | 5/2006 | Andoh | |
| D522,865 S | 6/2006 | Andoh | |
| D523,346 S | 6/2006 | Andoh | |
| 7,152,832 B2 | 12/2006 | Wochnick | |
| 7,163,311 B2 | 1/2007 | Kramer | |
| 7,300,171 B2 | 11/2007 | Sutton | |
| D571,153 S | 6/2008 | Lopez | |
| 7,383,650 B2 | 6/2008 | Duesler | |
| D574,249 S | 8/2008 | Seum et al. | |
| D575,583 S | 8/2008 | Morgan | |
| 7,413,082 B2 | 8/2008 | Adler et al. | |
| D596,037 S | 7/2009 | Slubski | |
| 7,690,533 B2 | 4/2010 | Stilley | |
| D617,200 S | 6/2010 | Goldburt | |
| 7,824,051 B2 | 11/2010 | Walter et al. | |
| 7,837,333 B2 | 11/2010 | Chou et al. | |
| 7,934,845 B2 | 5/2011 | Yang | |
| 7,954,970 B2 | 6/2011 | Goldburt | |
| 8,056,273 B2 | 11/2011 | Goldburt | |
| 8,123,033 B2 | 2/2012 | Goldburt | |
| 8,232,981 B2 | 7/2012 | Sandy | |
| 8,989,673 B2 | 3/2015 | Sandy | |
| 9,061,797 B2 | 6/2015 | Goldburt | |
| 2002/0097195 A1 | 7/2002 | Frank | |
| 2002/0104848 A1* | 8/2002 | Burrows | A61J 7/0481 221/1 |
| 2002/0126150 A1 | 9/2002 | Parry | |
| 2002/0169635 A1* | 11/2002 | Shillingburg | G06F 19/3462 705/2 |
| 2002/0190869 A1 | 12/2002 | Blotky et al. | |
| 2003/0099158 A1* | 5/2003 | De la Huerga | A61J 1/1437 368/10 |
| 2003/0122730 A1 | 7/2003 | Frank et al. | |
| 2003/0129283 A1 | 7/2003 | Martinez Carballido | |
| 2003/0226298 A1 | 12/2003 | Bjork | |
| 2004/0004829 A1 | 1/2004 | Policappelli | |
| 2004/0026357 A1 | 2/2004 | Beck et al. | |
| 2004/0118022 A1 | 6/2004 | Duesler | |
| 2004/0140286 A1 | 7/2004 | Zoller | |
| 2004/0148117 A1 | 7/2004 | Kirshenbaum et al. | |
| 2004/0206828 A1 | 10/2004 | Harris | |
| 2005/0024858 A1 | 2/2005 | Johnson | |
| 2005/0036301 A1 | 2/2005 | Haines | |
| 2005/0134461 A1 | 6/2005 | Gelbman et al. | |
| 2005/0152392 A1 | 7/2005 | Lim et al. | |
| 2005/0161558 A1 | 7/2005 | Stahl et al. | |
| 2005/0193612 A1 | 9/2005 | Lowry | |
| 2005/0205437 A1 | 9/2005 | Huffman | |
| 2005/0207141 A1 | 9/2005 | Boesch et al. | |
| 2005/0229449 A1 | 10/2005 | Shepley | |
| 2005/0270396 A1 | 12/2005 | Miyashita et al. | |
| 2006/0022806 A1* | 2/2006 | Auerbach | A61J 7/0481 340/309.16 |
| 2006/0087831 A1 | 4/2006 | Kramer | |
| 2006/0118507 A1 | 6/2006 | Feldman | |
| 2006/0139928 A1 | 6/2006 | Griffiths et al. | |
| 2006/0202042 A1 | 9/2006 | Chu | |
| 2006/0231109 A1 | 10/2006 | Howell et al. | |
| 2007/0024465 A1 | 2/2007 | Howell et al. | |
| 2007/0069883 A1 | 3/2007 | Collier et al. | |
| 2007/0091123 A1 | 4/2007 | Akashi | |
| 2007/0158293 A1 | 7/2007 | Andreani | |
| 2007/0299778 A1 | 12/2007 | Haveson et al. | |
| 2008/0023357 A1 | 1/2008 | Whiteis | |
| 2008/0034628 A1 | 2/2008 | Schnuckle | |
| 2008/0074625 A1 | 3/2008 | Lai et al. | |
| 2008/0100469 A1 | 5/2008 | Goldburt | |
| 2008/0108308 A1* | 5/2008 | Ullah | G06Q 30/02 455/41.2 |
| 2008/0128300 A1 | 6/2008 | Bahar et al. | |
| 2008/0149589 A1 | 6/2008 | Lach | |
| 2008/0264816 A1 | 10/2008 | Yeh | |
| 2008/0296191 A1 | 12/2008 | Ransch | |
| 2008/0314861 A1 | 12/2008 | Goldburt | |
| 2008/0317906 A1 | 12/2008 | Goldburt | |
| 2008/0319876 A1 | 12/2008 | Goldburt | |

(56) References Cited

U.S. PATENT DOCUMENTS

| | | |
|---|---|---|
| 2009/0293328 A1 | 12/2009 | Bull |
| 2010/0101124 A1 | 4/2010 | Sorensen |
| 2010/0182518 A1 | 7/2010 | Kirmse et al. |
| 2010/0300913 A1 | 12/2010 | Goldburt |
| 2010/0300914 A1 | 12/2010 | Goldburt et al. |
| 2011/0100852 A1 | 5/2011 | Goldburt |
| 2011/0100853 A1 | 5/2011 | Goldburt |
| 2011/0122120 A1 | 5/2011 | Feuilloley |
| 2011/0155604 A1 | 6/2011 | Goldburt |
| 2011/0303579 A1 | 12/2011 | Sanders |
| 2012/0105424 A1 | 5/2012 | Lee et al. |
| 2012/0171963 A1 | 7/2012 | Tsfaty |
| 2012/0239470 A1 | 9/2012 | Goldburt |
| 2012/0273372 A1 | 11/2012 | Goldburt et al. |
| 2013/0319892 A1 | 12/2013 | Goldburt |
| 2014/0094126 A1 | 4/2014 | Sandy |
| 2014/0324585 A1 | 10/2014 | Mederos |

FOREIGN PATENT DOCUMENTS

| | | |
|---|---|---|
| WO | WO 03/099039 | 12/2003 |
| WO | WO 2010/138107 | 12/2010 |
| WO | 2013179239 | 12/2013 |

OTHER PUBLICATIONS

International Search Report from PCT/US2009/006751, mailed Aug. 17, 2010.
Written Opinion from PCT/US2009/006751, mailed Aug. 17, 2010.
International Preliminary Report on Patentability from PCT/US2009/006751, mailed Nov. 29, 2011.
International Preliminary Report on Patentability for Application No. PCT/US2015/030896 dated Nov. 15, 2016, 7 pages.

* cited by examiner

US 9,628,434 B2

PROGRAMMABLE ELECTRONIC DEVICES ON CONTAINERS

PRIORITY CLAIM TO RELATED APPLICATION

This application claims the benefit under 35 U.S.C. §119 (e) of U.S. Provisional Patent Application No. 61/993,963, filed on May 15, 2014, the entirety of which is incorporation herein by reference.

TECHNICAL FIELD

Implementations described herein generally relate to electronic devices and more particularly to electronic devices with sensors that are capable of being attached or integrated with objects.

BACKGROUND

Objects such as beverage containers are often decorated with static designs and letters to attract the attention of prospective consumers. The static designs and letters are selected by the manufacturers and are not modifiable by a distributor, retailer or end consumer. Often in a retail setting, such as a store or bar, the beverage containers are placed on shelves to enhance their visibility to passing consumers. In addition to the fancy static designs, the beverage containers are often constructed of transparent or translucent material, which enhances the aesthetics and may allow the remaining fluid quantity to be externally visible so that the inventory may be monitored and replaced when necessary.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

Reference will now be made to the accompanying drawings showing examples of the present application, and in which.

DETAILED DESCRIPTION

Figure 1:
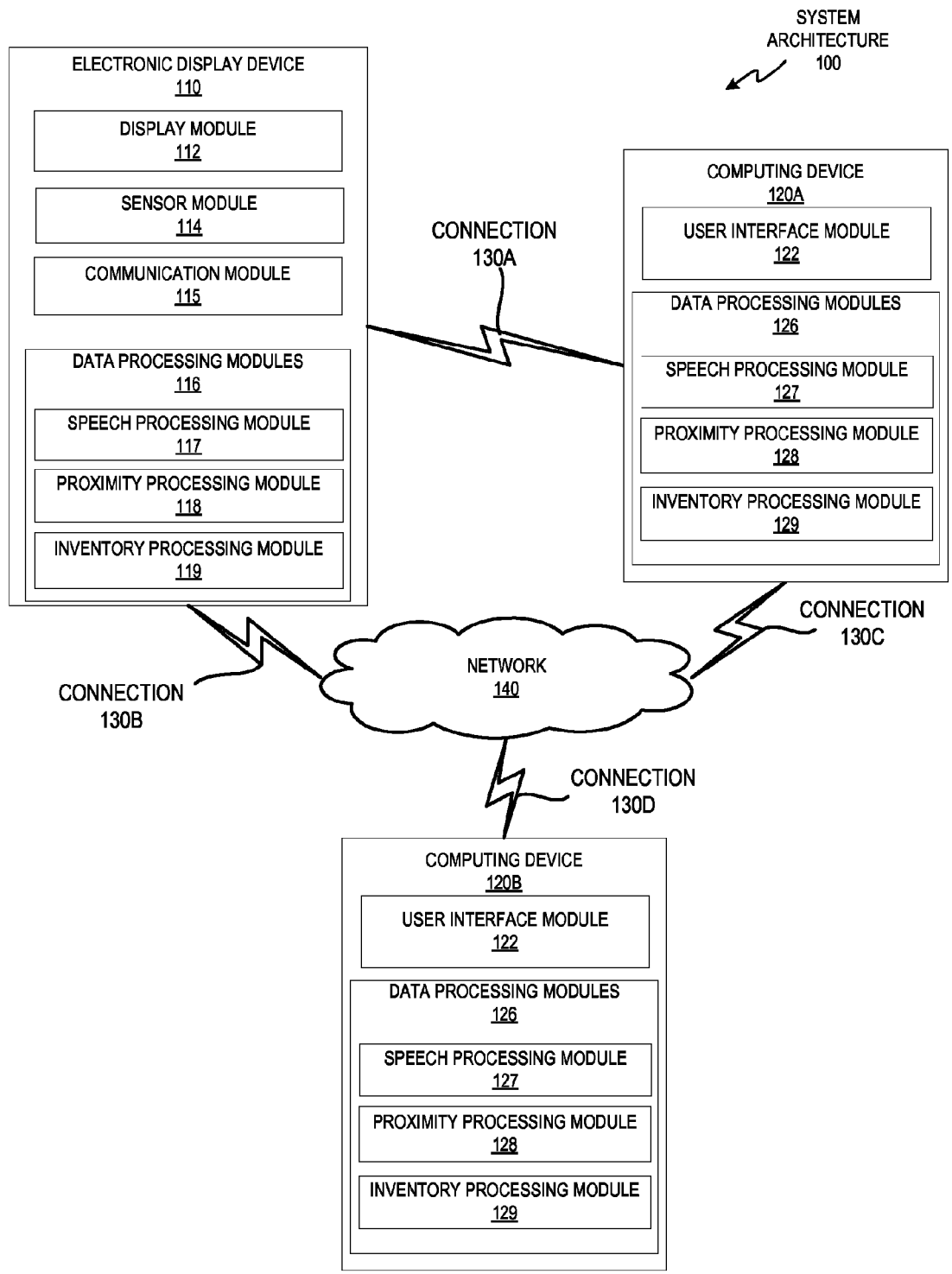
FIG. 1 is a block diagram depicting an example system architecture for an electronic display device integrated with an object and wirelessly connected to computing devices, in accordance with an example of the present disclosure.

Described herein are objects, such as beverage containers, with electronic devices (e.g., electronic display devices) having sensors and communication modules. The sensors may gather data concerning the internal or external conditions of the object and the communication modules may transmit messages based on the data. The data may be processed by the electronic device and may be transmitted to a computing device (e.g., a mobile device or cloud computing device) for additional processing. The processing of the data may result in a message that may be displayed by the electronic device to a user and/or by a mobile device of the user.

In one example, the object may include an electronic display device with audio sensors for gathering voice data from a user, which may allow the user to speak to the object to control what the object displays. The voice data may include a voice command and a subsequent message. The electronic display device may process the voice data to recognize the voice command and may also send the voice data to a remote computing device for additional processing. The processing may include speech-to-text translation, which may translate the voice data to a textual message that may be sent to the object. The textual message may then be displayed by the object using the electronic display device.

In another example, the object may include an electronic device with proximity sensors for gathering data about users in its vicinity. The proximity sensors may allow the object to detect and identify users in an area as well as gather consumer information from the users. The object and/or electronic device may gather the consumer information by using a combination of motion sensors and communication modules. For example, the motion sensors may detect the presence of a user and the wireless communication module may establish a connection with the user's computing device. The user's computing device may respond with a welcome message ("Hello John Doe") and the object may display the welcome message to attract the attention of the user.

In yet another example, the object may include an electronic device with a fluid-level sensor for gathering data about the quantity of fluid within the object. This may allow the object to monitor its contents and determine when the object should be replaced. The object and/or electronic device may accomplish this by processing the data to calculate a fluid level and comparing the fluid level to a threshold level to determine whether the object should be replaced. The object may then send a message to a computing device, which may provide a user interface that enables a user to order a replacement object. The computing device may also respond with a textual message (e.g., "Replace Me" or "I have been ordered") to be displayed by the electronic device of the object (e.g., if the electronic device is an electronic display device).

There are shown in the drawings and will herein be described in detail several specific examples with the understanding that the present disclosure is to be considered as an exemplification of the principles of the described technology and is not intended to limit the technology to the examples illustrated.

The terminology used herein is for the purpose of describing particular embodiments only and is not intended to be limiting of the invention. As used herein, the singular forms "a", "an" and "the" are intended to include the plural forms as well, unless the context clearly indicates otherwise.

It will be understood that like or analogous elements and/or components, referred to herein, may be identified throughout the drawings with like reference characters. It will be further understood that several of the figures are merely schematic representations of embodiments of the present technology.

Embodiments are discussed herein with reference to electronic display devices that are mounted to or embedded in a container. However, embodiments also cover other types of electronic devices that mount to or are embedded in a container. Such other electronic devices may rely on displays of computing devices (e.g., of mobile devices carried by users) to display messages. Accordingly, it should be understood that discussion of electronic display devices herein also applies to other types of electronic devices that do not have displays.

Referring to the figures, FIG. 1 is a block diagram depicting an example system architecture 100 including an electronic display device 110 and one or more computing devices 120A and 120B. Electronic display device 110 may be communicably coupled to the one or more computing devices 120A and 120B using connections 130A-D and network 140. In one example, electronic display device 110 may be a portable display associated with an object or a part of (e.g., integrated into) an object, such as a beverage container. Alternatively, an electronic device that does not include a display may be used.

Electronic display device 110 may include a display module 112, a sensor module 114, a communication module 115 and data processing modules 116. Display module 112 may include an electronic visual display that may be illuminated to display an image or alphanumeric message. The image or alphanumeric message may be static or may be displayed in a manner that appears to show movement (e.g., motion picture or scrolling text). The electronic visual display may include light emitting diodes (LEDs), organic light emitting diodes (OLEDs), liquid crystal display (LCDs), or other similar display technology. Display module 112 may have a variety of sizes and include pixels of various colors. In one example, display module 112 may cover a portion of an object's exterior face or the entire exterior face of the object in all angles (0 degrees to 360 degrees).

Sensor module 114 may include one or more sensor devices for gathering data associated with the object. The sensor devices may include audio sensors (e.g., microphones), motion sensors (e.g., accelerometer, gyroscope, etc.), fluid measuring sensors (e.g., mechanical gyrator), lights sensors (e.g., ambient light sensor), location sensors (e.g., global positioning system sensors (GPS)), temperature sensor (e.g., thermometer), or other similar sensing devices. Data generated by sensor module 114 may be processed locally by the electronic display device 110 and/or remote from electronic display device 110. For example, an audio signal may be analyzed and packaged locally to electronic display device 110 and may be sent to a remote device to perform speech to text processing.

Data processing modules 116 may include one or more modules for processing data (e.g., sensor data) to determine a message to display. Data processing modules 116 may include hardware, software, firmware, or a combination thereof. The hardware may include a processing device and memory blocks. Data processing modules 116 may be software or firmware modules stored in the memory and executed by the processing device in one embodiment. Data processing modules 116 may include a speech processing module 117, a proximity processing module 118 and an inventory processing module 119.

Speech processing module 117 may access voice data from the audio sensor and may process the voice data to translate it into text. In one example, speech processing module 117 may interact with a speech processing module on a remote computing device in order to translate the voice data. The speech to text capability may be used for programming the portable display. For example, a user may say the words "Happy New Year" into the microphone and the speech processing module 117 may receive audio data from the microphone and process the audio data to identify the words and generate a corresponding textual message. The electronic display device 110 may then display the text "Happy New Year." Proximity processing module 118 may access data gathered by the proximity sensor and may process the data to determine whether a user (e.g., consumer) is in the area. In one example, proximity processing module 118 may determine consumer information corresponding to the user and may generate a textual message (e.g., a greeting) in response. Inventory processing module 119 may access data gathered by a fluid level sensor and may process the data to determine whether a message is to be displayed to the user or sent to a computing device (e.g., to a user's mobile device and/or to a server computing device) to instruct the user to replace the bottle.

Communication module 115 may enable electronic display device 110 to receive and transmit messages. Communication module 115 may include a transmitter, receiver, transceiver, memory, antenna, and so forth for communicating with a computing device. Such communications may be between an object and one or more remote computing devices (e.g., 120A and 120B) or from object to object (e.g., beverage container to beverage container), object to a smartphone, computer, tablet, etc., or object to a local router. The messages may be received or transmitted through specific channels locally or over longer distances.

Communication module 115 may utilize any commercially available wired or wireless communication protocol, whether standardized or proprietary. When using a wireless protocol it may utilize any portion of the electromagnetic spectrum (e.g., radio, optical, infrared). Exemplary wireless connections may include Bluetooth®, Bluetooth low energy (BLE), Near Field Communication (NFC), Wi-Fi®, infrared (IR), Linux® wireless, Zigbee®, any other low frequency RF modulation, microwave, radar, or other similar connections. Wireless connections may include ranges of various transmission frequencies ranging from 0 Hz to Infinite Thz. Exemplary transmission ranges may include the following:

| sub Hz | <3 Hz | Sub Hertz |
|---|---|---|
| ELF | 3 Hz-30 Hz | Extremely Low Frequency |
| SLF | 20 Hz-300 Hz | Super Low Frequency |
| ULF | 300 Hz-3 kHz | Ultra Low Frequency |
| VLF | 3 kHz-30 kHz | Very Low Frequency |
| LF | 30 kHz-300 kHz | Low Frequency |
| MF | 300 kHz-3 MHz | Medium Frequency |
| HF | 3 MHz-30 MHz | High Frequency |
| VHF | 30 MHz-300 MHz | Very High Frequency |
| UHF | 300 MHz-3 GHz | Ultra High Frequency |

-continued

| | | |
|---|---|---|
| SHF | 3 GHZ-30 GHz | Super High Frequency |
| EHF | 30 GHz-300 GHz | Extremely High Frequency |
| Sub-M | 300 Ghz- | Infinite THz Sub Millimeter |

Communication module 115 may be used to initiate or establish connections 130A-D, which may include wireless or wired connections. Connections 130A-D are example connections for communicable coupling of electronic display device 110 to one or more computing devices 120A and/or 120B. Connections 130A-D may include direct connections and indirect connections. Direct connections (e.g., connection 130A) may directly connect electronic display device 110 with computing device 120A and may not use any intermediate networking elements (e.g., access point, router, switch, hub) to connect the devices. This may be implemented using a wireless technology such as Bluetooth, Peer-to-Peer Wi-Fi, or infrared. An indirect connection may include multiple connections 130B and 130C a network 140 or multiple networks. An indirect connection may also utilize a direct connection, for example, electronic display device 110 may utilize a direct connection (e.g., 130A) with computing device 120A to indirectly communicate with computing device 120B, as shown by connection 130A→130C→130D.

Network 140 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network) and may include a wireless access point, network routers, switches or other similar network devices or combination thereof.

In other examples, communication module 115 may include ports for a wired connection, such as a universal serial bus (USB) port, a serial port, or other similar communication port. Exemplary wired connections may include USB, Micro USB, Mini USB, institute of electrical and electronics engineers (IEEE) 1394 (such as Firewire®), or other similar connections.

Computing devices 120A and 120B may be any devices capable of communicating with electronic display device 110, including mobile devices (e.g., such as smart phone, tablet computer, laptop, etc.) or non-mobile devices (e.g., such as desktops, servers or cloud based computing devices). In one example, computing device 120A may be a mobile device and computing device 120B may be a physical machine and/or virtual machine that hosts a web platform (e.g., a cloud-based service). Electronic display device 110 may be communicably coupled to computing device 120B (e.g., cloud-based service) through computing device 120A, network 140 or a combination of both. This may allow computing device 120B (e.g., cloud device) to receive messages initiated by the electronic display device 110 and to generate and transmit messages to electronic display device 110 for display. In another example, the electronic display device 110 may be communicably coupled with computing device 120B (e.g., cloud computing device) using connections 130B and 130D and therefore without communicating via computing device 120A.

Computing devices 120A and/or 120B may function as a web platform (e.g., cloud-based service). The web platform may be configured to enable turning an object including or associated with electronic display device 110 into a billboard, offer advertisements directly on the web platform, or offer downloadable applications right to the object itself. Optionally, the web platform may generate a marketing channel by selling access to the channel. For example, the object including the electronic display device 110 may be preprogrammed to only receive advertisements on transmission of a specific pin or code. In another example, the web platform may have accounts and grant authorization to specific accounts to send advertisements to objects. In another example, the web platform may entice people to 1) program objects or beverage containers, 2) interact with other people, and 3) manage their applications. The web platform may allow programmers to build and sell their own applications for the containers or objects. In various examples, an alternate centralized system and method for channel control may be used (e.g., Centralized Medea Ad Space Channel). Such a centralized system may control messages to individual, segmented, targeted, and universal objects and vendors. Optionally, the system may allow cross selling of advertisement space on the objects to non-alcoholic or various product types. For example, ad space may be sold on alcoholic objects to Mercedes®, Coca-Cola®, etc.

Computing devices 120A and 120B may include respective user interface module 122 and data processing modules 126 such as speech processing module 127, proximity detection module 128 and inventory processing module 129. The modules may include hardware, software, firmware or a combination thereof. User Interface modules 122 may include an application that may run (e.g., execute) on computing devices 120A and 120B and may allow a user to interact with and configure the electronic display device 110. User interface module 122 may allow a user to identify a specific object (e.g., an object that includes electronic display device 110). For example, the user may utilize user interface module 122 to input an object identification number by scanning, typing, or speaking a number. This may then enable the application to configure the electronic display device for that particular object (e.g., a bottle), which may include setting the display message.

In one example, the user interface module 122 may be a downloadable application for a mobile device. For example, mobile devices may include Android, iPhone, or Blackberry devices capable of running a software application (e.g., Android Smart Bottle software App, iPhone Smart Bottle software App, Blackberry Smart Bottle software App, etc.). The application may allow a user to wirelessly program an electronic display device of an individual object or container directly through the mobile device. In other embodiments, the electronic display device may be controlled through hands-free voice commands. Similarly, the application may be operated by voice commands.

In one embodiment, the invention may include a social media experience. The electronic display device 110 may utilize the wireless connection 130B and receive or download a program or application for entertainment, e.g. a drinking game connected to an application. In another example, the user interface module 122 may be an application on a web platform or social media platform.

Data processing modules 126 of computing devices 120A or 120B may interact with data processing modules 116 of electronic display device 110 to perform functions. For example, speech processing module 127 may interact with speech processing module 117 to analyze and process voice data to translate it into text. Inventory processing module 128 may interact with inventor processing module 118 to determine, for example, whether an object has a fluid level below a threshold level. Responsive to determining that the fluid level is below the threshold level, inventory processing module 119 and/or inventory processing module 129 may prompt a user to order a replacement object.

Electronic display device 110 may be preprogrammed or accept programming (e.g., configuration settings) from a user either directly via an input device on the electronic display device or from remote computing devices 120A or 120B.

In one example, display module 112 may be used for advertising or displaying various images or messages, such as greetings, calendar events (e.g., birthdays, anniversaries, holiday messages, events of cultural significance). Optionally, the display module may utilize animated images or messages. For example, messages may scroll from any direction, strobe, glow, etc.

The messages or images may allow the objects to serve as an advertising or marketing channel. The marketing channel may allow for multiple levels of distribution (e.g., directly to customers, through a distributor, etc.). A customizable communication or message allows for maximum flexibility. A cloud service may also provide other services to the portable device. For example, the cloud service may provide an advertising service that periodically downloads advertisements to the portable display. In some embodiments in which display module 112 is not included, the system architecture 100 includes an electronic device other than an electronic display device. The electronic device may include the sensor module 114, communication module 115 and data processing modules 116.

Figure 2:
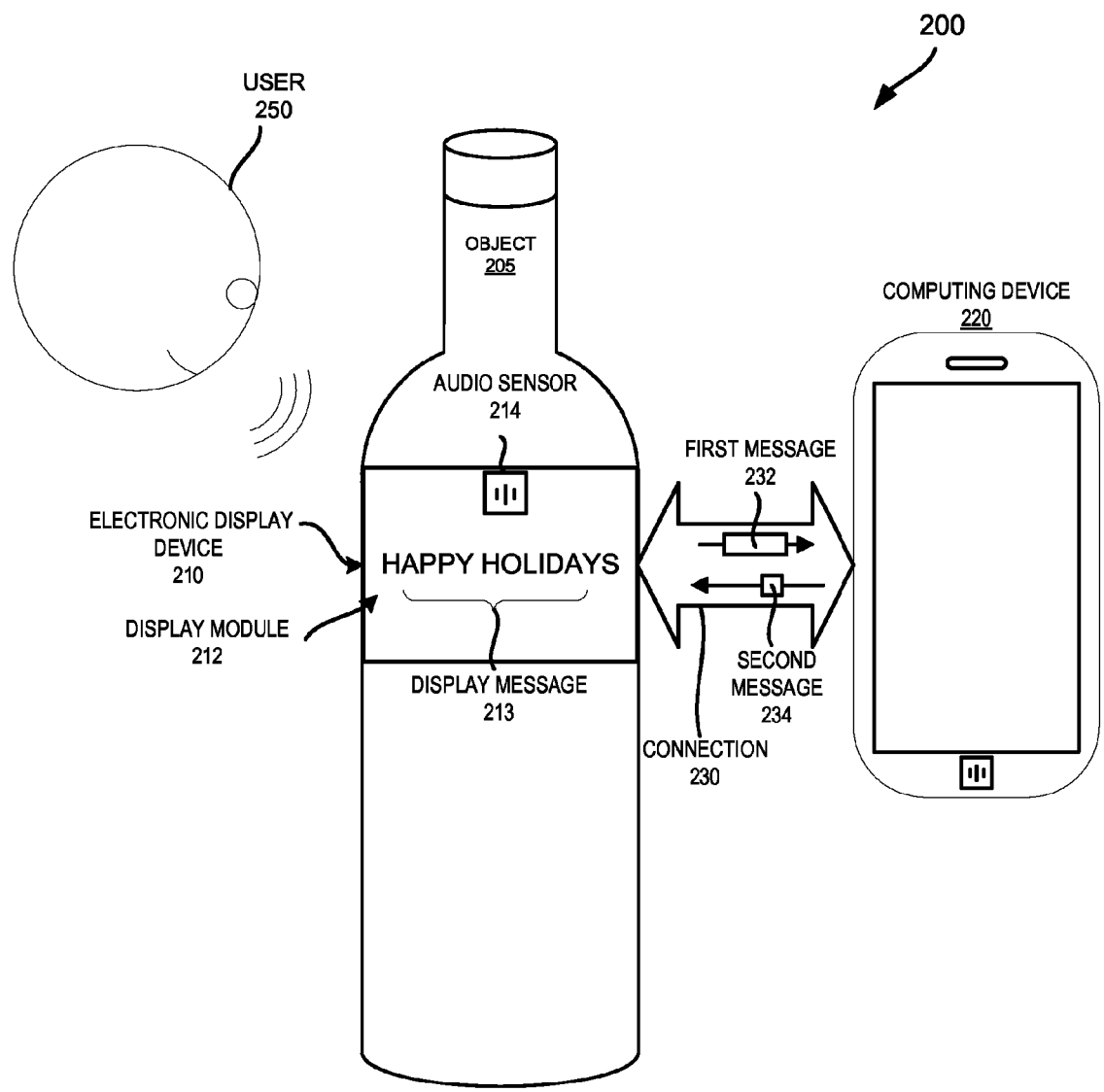
FIG. 2 is an illustration depicting an electronic display device including audio sensors and speech processing capabilities, in accordance with one example.

Referring now to FIG. 2, there is provided an illustration depicting a system 200 having an electronic display device 210 including an audio sensor 214 and speech processing capabilities. System 200 may include object 205, electronic display device 210, computing device 220, first message 232, second message 234 and user 250. In one embodiment, electronic display device 210 may correspond to electronic display device 110 of FIG. 1.

Object 205 may be a container for holding items or fluid. The fluid may be a human consumable fluid such as a beverage or may be fluid for another purpose. In one example, object 205 may be a beverage container that contains an adult beverage such as alcohol. While the following embodiments describe the invention in relation to beverage containers (e.g., bottles for alcoholic or non-alcoholic beverages, glasses, cups, etc.), it should be understood that the invention is not solely limited to these embodiments and may be applied to other containers or objects. In the embodiments described below, the object 205 may be made of various material, such as aluminum, plastic, glass, ceramic, metal, crystal, or other similar materials.

Electronic display device 210 may be attached to object 205, such that it appears to be integrated with the object 205. In one example, the electronic display device 210 may utilize an attachment mechanism (e.g., clip, magnets, adhesive) to attach to object 205 while the object is in use or on display. The electronic display device 210 may be detached from the object 205 via the attachment, such as for use on another object. For example, electronic display device 210 may be attached to a beverage container while the beverage container contains fluid. However, once the beverage container is empty, electronic display device 210 may be removed from the beverage container and temporarily attached to another object.

In some examples, electronic display device 210 may be a device that conforms to the shape of the object and attached thereto, such as by wrapping or snapping onto the object (e.g., a bottle). Such an electronic display device 210 may adapt to any shape or size of container or other object. Optionally, such an electronic display device 210 may have a flexible screen or include a flexible image film technology to wrap around or as a "sleeve" to any object or container or product wrapper. For example, the electronic display device 210 may include a module with active components (e.g., LEDs, processing device, memory, battery, etc.) that is connected to a sleeve that can fit around a bottle. The sleeve may be plastic, polymer, rubber, or other flexible material. The sleeve may stretch to conform to the shape of the object that it is fit around. Optionally, portable displays may be interchangeable between objects and be associated with the object it is attached to. Other embodiments may include a an electronic device molded or printed onto the outer surface of the object or embedded within the material of the object. Such an electronic device may include a display that is visible when viewing the object. The electronic device may be powered using a power source, such as a battery, solar cells, or other similar power sources.

Electronic display device 210 may also include a sensor module (e.g., such as sensor module 114 of FIG. 1) having an audio sensor 214 or similar sensor device capable of capturing sounds (e.g., a microphone) and transforming it into data. The data may take the form of an audio signal that may be stored locally in a memory of the electronic display device 210, or may be transmitted to a local processing device of electronic display device 210 to be processed. Alternatively, or in addition, the data may be transmitted to computing device 220 for processing.

In one embodiment, a processing device of electronic display device executes a speech processing module. The processing device may process the data to determine whether the data satisfies a criterion, such as whether the data includes legible speech (e.g., over a decibel threshold) or whether the voice data exists for a duration of time that exceeds a duration threshold (e.g., 2 seconds). The processing device may measure one or more acoustical features of the data such as loudness, pitch, bass, brightness, bandwidth, Mel-frequency cepstral coefficients (MFCCs), and so forth. The processing device may additionally determine other characteristics of the data, such as a duration of time associated with the data (e.g., a duration of time the sound was recorded). In one embodiment, processing performed by the processing device may include generating a Fourier transformation of the data and/or generating a feature vector of the data. If one or more of the acoustical features and/or other characteristics of the data satisfy one or more criteria, then the data may be stored, transmitted, or additionally processed, and/or a message may be sent to computing device 220. For example, if the data satisfies the criteria it may be included in a first message 232 to computing device 220. If the data does not satisfy the one or more criteria, then the data may be deleted and/or no further action may be taken with respect to the data.

First message 232 may be sent from electronic display device 210 to computing device 220 over connection 230. In one example, the first message 232 may include a portion of the audio signal as raw voice data. In another example, the voice data may undergo pre-processing prior to being packaged within first message 232. The pre-processing may include compressing the audio signal or removing portions of the audio signal that do not include voice data. For example, there may be five seconds of raw voice data and the pre-processing may trim the portion of the audio signal before the speech began and the portion after the speech concluded. The preprocessing may also remove the blank portions of the audio signal between words and tokenize the voice data.

Tokenizing the voice data may include identifying the beginning and ends of words and subsequently separating the audio signal based on the words so that there is approximately one token for each word. Alternatively, tokenizing the voice data may involve separating a voice command portion of the voice data from the body of the voice command. For example, if the user says "Display Message Happy Holidays" the pre-processing may identify the first portion (e.g., "display message") as being a voice command and may make that a token and then make the remaining portion "Happy Holidays" into another token. In this situation, the first portion may be processed locally by the processing device of the electronic display device and the remaining portion may be included within first message 232 and sent over the connection to computing device 220 to be processed by a speech processing module of computing device 220.

Pre-processing the data including the audio signal may additionally or alternatively include compressing the audio signal. For example, the audio signal may be compressed using a lossy or lossless audio compression algorithm. For example, the audio signal may be processed into one or more waveform (WAV) audio files, audio interchange file format (AIFF) audio files, AU audio files, or other uncompressed audio files. Alternatively, the audio signal may be processed into a lossless compression audio file format (e.g., free lossless audio codec (FLAC), true audio (TTA), Apple lossless (m4a), Windows media audio lossless (WMA lossless), etc.) or a lossy compression audio file format (e.g., an MP3 audio file format, Vorbis, advanced audio coding (AAC), OGG, etc.).

Computing device 220 may be a mobile device, such as a smartphone that is able to receive first message 232 and subsequently transmit second message 234 (e.g., response). In one example, computing device 220 may rely on another computing device (e.g., remote server) to process first message 232 and generate second message 234. In another example, computing device 220 may process first message 232 to generate second message 232. Either or both computing devices may be equipped with a speech processing module that may perform speech to text translation (e.g., speech recognition) on the audio signal included within first message 232. The computing device may process the audio signal locally using a combination of hardware and software and may send the message to another computing device (e.g., a server, cloud device, etc.) to perform speech recognition. The results of the speech recognition may be modified by computing device 220 and/or the server to address translation problems based on sentence structure or context, for example, "Mary Christmas" may be changed to "Merry Christmas") and may be formatted as a textual message. The textual message may be included in second message 234 and sent back to electronic display device 210. As shown in FIG. 2 computing device 220 is a mobile device. However, in other examples computing device 220 may be a cloud computing device, web platform, server, desktop, laptop or other similar computing device.

Second message 234 may include the textual message and may be used to transmit the textual message from the computing device 220 to electronic display device 210. In response to receiving second message 234, the electronic display device 210 may format textual message into display message 213 (e.g., "Happy Holidays") and/or present it to user 250 by illuminating display module 212 (e.g., by outputting the textual message to display module 212).

In an alternative example, electronic display device 210 may include a connection 230 to a wireless local area network (WLAN), and through the WLAN to a remote cloud service. The remote cloud service may program the electronic display device 210, and/or may provide remote processing services for the electronic display device 210. For example, a speech processing module of electronic display device 210 may cause electronic display device 210 to transmit voice data to the cloud service via the WLAN connection. The cloud service may process the speech data to identify the words that were spoken, and may send text (e.g., ASCII characters) to the electronic display device 210. Accordingly, the cloud service may provide speech recognition to electronic display device 210.

Figure 3:
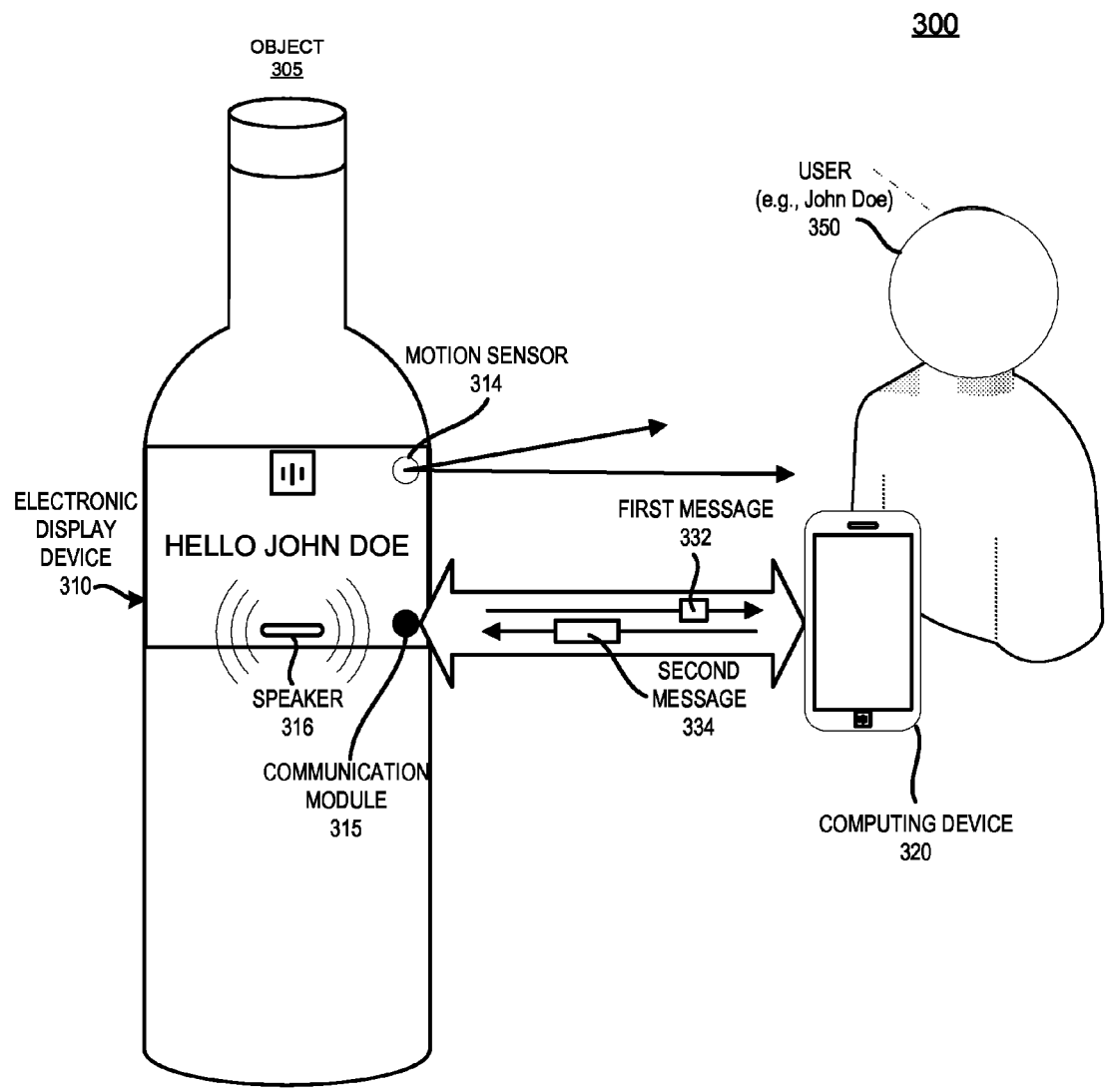
FIG. 3 is an illustration depicting an electronic display device including proximity sensors for detecting activity in the vicinity of the electronic display device, in accordance with yet another example.

FIG. 3 is an illustration depicting a system 300 having an electronic display device 310 that has one or more sensors (e.g., motion sensor 314) for detecting activity in the vicinity of an object 305. When activity is detected, the electronic display device 310 may provide or output a consumer targeted display message. The targeted display message may include a personalized greeting that may identify a detected consumer by name. In one example, a communication module 315 of the electronic display device 310 may detect a computing device 320. For example, the communication module 315 may be a Bluetooth module or Wi-Fi module that outputs a signal. Computing device 320 may additionally have its own Bluetooth module or Wi-Fi module, which may also output a signal. When communication module 315 receives a signal from the Bluetooth or Wi-Fi module of computing device 320, it may identify the computing device 320 based on that signal. In one embodiment, computing device 320 executes an application associated with electronic display device 310. The application may cause computing device 320 to identify to electronic display device 310 a user account logged into the application. This may enable the electronic display device 310 to perform one or more actions with respect to the user account.

In one embodiment, electronic display device 310 sends a message to the computing device 320 directed to the user account. For example, the message may be a personalized message that welcomes a user associated with the user account to a bar or other establishment that owns the object 305. The message may also be a personalized advertisement or other personalized message. This message may be displayed on the computing device. In one embodiment, electronic display device 310 presents a message on the display of the electronic display device directed to the user account. For example, the object's electronic display device 310 may detect a customer's phone in a bar through an installed mobile application on the phone and send an advertisement to the phone and/or display a greeting through the display on the electronic display device 310. Optionally, messages may be sent to the electronic display device 310 or computing device 320 through a web platform (e.g., cloud computing device) or various social media platforms (e.g., Facebook®, Twitter®, etc.).

The electronic display device 310 may also receive instructions from the phone or other computing device 320, and may output a display in accordance with the received instructions. For example, when a customer walks into a bar having beverage containers with attached electronic display devices as described herein, the customer's mobile device may send a message to the electronic display devices announcing the customer's entrance. The electronic display devices may then display the customer's name for a time period.

As shown in FIG. 3, system 300 may include object 305, electronic display device 310, motion sensor 314, communication module 315, speaker 316, computing device 320 and user 350. Electronic display device 310 may be attached to object 305 and may include one or more motion sensors 314 for gathering data from the surroundings of object 305, which may include user 350. The motion sensor 314 may be, for example, an optical motion sensor, a microwave motion sensor or an acoustic motion sensor. In one example, motion sensor 314 may be an active motion sensor that may emit an electromagnetic field or a beam of electromagnetic radiation and detect changes in the field or return signal. In another example, motion sensor 314 may also be a passive motion sensor that detects changes to the surrounding without emitting any radiation.

Additionally, or alternatively, electronic display device 310 may include a proximity sensor able to detect the presence of nearby people or other objects without physical contact. The proximity sensor may be based on photoelectric sensing, capacitive sensing, inductive sensing or other similar sensing mechanism.

Electronic display device 310 may include communication module 315 (e.g., Bluetooth), which may also function as a proximity detector as described above. Communication module 315 may periodically scan (e.g., every 1 min, 60 min) the area to detect computing device 320 or may be triggered by motion sensor 314. In one example, when motion sensor 314 detects a user in the vicinity it may trigger communication module 315 to scan the area searching for computing device 320. When computing device 320 is detected, communication module 315 may initiate or establish a connection with computing device 320. In one example, the connection may allow electronic display device 310 to probe communication device 320 to determine if the computing device includes the user interface module associated with an electronic display device (e.g., smart bottle app). In another example, computing device 320 may establish a connection if the user interface module has been configured (e.g., installed, running). In such an embodiment, the existence of an established connection may indicate that the computing device includes the user interface module.

Once electronic display device 310 has established a connection with computing device 320, the electronic display device 310 may transmit first message 332 to computing device 320. First message 332 may include a request for information, such as user identification information or a personal greeting. In response to receiving first message 332, computing device 320 may access the settings associated with the user interface module. The settings may include a user's preconfigured personal greeting data and identification data. This data may then be included within a second message 334 and sent from the computing device 320 to the electronic display device 310. In one example, the personal greeting may be a textual message, such as "Hello" and the identification information may be a textual message, such as the person's name (e.g., John Doe). In another example, second message 334 may also include an audio message for enunciating the message. After receiving second message 334, the electronic display device 310 may welcome the user by activating the display and/or speaker and causing the display and/or speaker to output contents of the second message. This may include illuminating electronic display device 310 with the textual message or by announcing the audio message using speaker 316. As shown in FIG. 3 computing device 320 is a mobile device. However, in other examples the processing to generate the second message may be performed by a cloud computing device, web platform, server, desktop, laptop or other similar computing device.

In addition to the proximity example discussed above, the electronic display device 310 may also utilize other motion sensors such as accelerometers and/or gyroscopes that are on the object or in the surrounding area for sensing movement of the object 305. Such motion sensors may be connected to transmitters or receivers on the object to provide information to social media platforms or mobile device applications as the object (e.g., beverage container) is poured or moved or the display activated. Alternatively, or additionally, the motion sensors may activate the electronic display device 310 and/or cause messages to be scrolled across the display of the electronic display device 310 when certain motion signatures are detected. For example, the motion sensors 314 may detect that the object has been tapped and in response may cause the electronic display device to turn on or transition out of a low power state. The electronic display device 310 may also transmit a command to other nearby electronic display devices to cause those electronic display devices to turn on.

Other types of motions such as vibrations or particular motion signatures may also be used to turn on the electronic display device and/or cause the electronic display device to output particular messages. For example, the electronic display device may detect when an object is upside down, and may output a particular message when the object is upside down. The electronic display device may also detect if the object is shaken, or twirled, or moved in an arc or circle, etc., and may output particular messages associated with these motion signatures.

In one embodiment, motion signatures may be stored by the electronic display device 310. When a motion is detected, electronic display device 310 may compare a detected motion to stored motion signatures. Each stored motion signature may be associated with a particular message and/or action. If a match is identified between the detected motion and a stored motion signature, the associated message may be output and/or the associated action may be performed. Examples of actions include sending a message to a computing device and/or posting a message to a social media platform. Alternatively, computing device 320 may store the motion signatures, and electronic display device 310 may send a recorded motion to computing device 320 for comparison to stored motion signatures. Computing device 320 may then notify electronic display device 310 is any match to a stored motion signature is identified.

Figure 4:
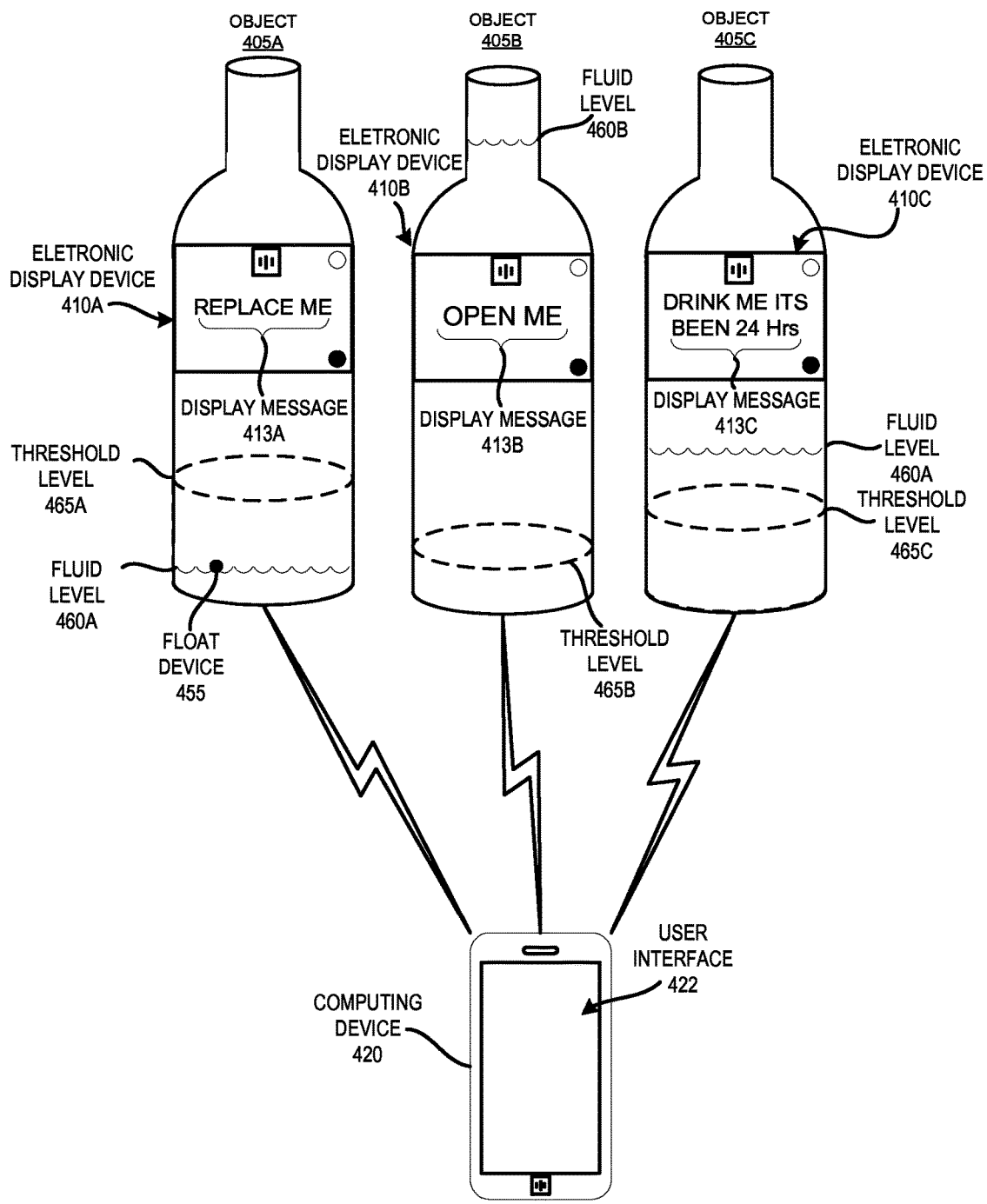
FIG. 4 is an illustration depicting multiple electronic display devices integrated with multiple fluid containers containing fluid sensors and inventory processing capabilities, in accordance with another example.
Figure 5:
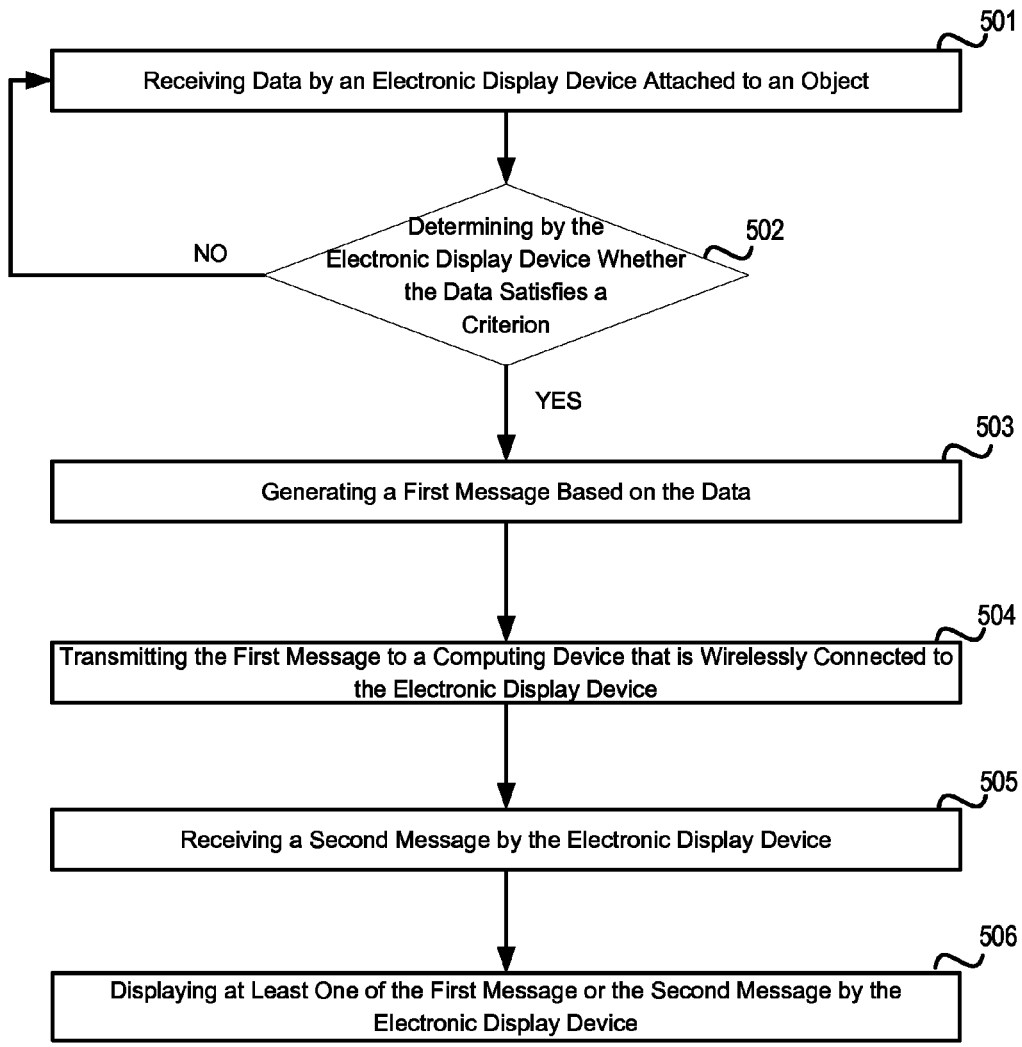
FIG. 5 is a flow chart of an example of a method for processing data and for displaying messages on a display of the electronic display device.

FIG. 4 is an illustration depicting a system 400 including electronic display devices with fluid sensors and inventory processing capabilities. This may allow electronic display devices 410A-C (or other electronic devices) to monitor the fluid levels of associated objects (e.g., bottles to which the electronic display devices 410A-C are attached) and notify users when the fluid levels drop below a threshold level. Electronic display devices 410A-C may notify the user by displaying a message or sending a notification (e.g., alert) to a computing device 420.

As shown in FIG. 4, system 400 may include multiple electronic display devices 410A-C that are attached to multiple objects 405A-C, respectively. Each electronic display device 410A-C may include a level sensor (not shown) for identifying a respective fluid level 460A-C. The level sensor may be a continuous-level sensor that provides continuous measurements across a range of fluid levels or may be point-level sensor that detects whether the substance is above or below a specific sensing point. The level sensor may be placed anywhere in or on the object. The level sensors may be connected to a transmitter, which may signal the amount of liquid in the object along with the liquid specificity range for said liquid. In one embodiment, electronic display devices 410A-C correspond to electronic display device 110 of FIG. 1, and each electronic display device includes a sensor module that includes one or more level sensors.

The level-sensor may utilize multiple different mechanisms to detect the fluid level. In one example, the electronic display device may include a mechanical gyrator for detecting the fluid level of the object. The mechanical gyrator may determine the fluid level by monitoring the motion of the bottle as well as the reactive motions of the fluid containers. For example, the gyrator may sense when the object's position is altered (e.g., tipping bottle to pour). The gyrator may also sense the subsequent movements that result from the fluid in the object shifting, for example, the rotational force generated when the fluid within the object impacts the top of the fluid container. The level sensor may also take into account the duration of time between the movement of the bottle and subsequent fluid movements. These motion measurements may be compared to motion fingerprints that are associated with various quantities of fluid to approximate the fluid level. In another example, the level sensor may include a float device 455 that has a specific gravity that is less than the fluid, which may cause the float device to remain at the top surface of the fluid. The level sensor may identify the location of the float and therefore determine the fluid level. Level sensor may utilize other mechanisms to measure the fluid level, such as ultrasonic, conductive, infrared, magnetic, pneumatic or other similar methods for detecting a level of a fluid. For example, an optical level sensor may include an optical emitter (e.g., an infrared emitter) and an optical detector (e.g., and infrared detector). The optical emitter may emit a light beam. The light beam may travel through the object and be reflected off of a wall of the object. An index of refraction of a liquid in the object may be different from an index of refraction of air. Accordingly, the reflected optical beam may not be detected (or may be detected) by the optical detector if the fluid level drops below a location of the optical emitter and/or the optical detector.

Each electronic display device 410A-C may be configured to modify the threshold level and the type of notification that occurs when the fluid level drops below the threshold level. Alternatively, the threshold level may be preconfigured, and may be the same for each object. As shown by object 405A, the threshold level 465A may be set at approximately one quarter of the bottle. This may be set by the computing device 420 or may be a default value set by a manufacturer or distributor. When the fluid level drops below threshold level 465A, as shown by fluid level 460A a notification may be generated. The type of notification may be modifiable. For example, electronic display device 410A of object 405A may be configured to illuminate the display with a customizable textual message, such as, display message (i.e., "REPLACE ME"). The notification may also include an additional message (e.g., alert) sent from electronic display device 410 to computing device 420. The message may include the current fluid level or may indicate the object needs to be replaced without indicating the fluid level. Each object 405A-405C may periodically report its fluid level to computing device. Computing device may use this information to determine inventory levels.

Computing device 420 may receive the additional message and present an alert message or present a user interface 422 for assisting the user to replace the bottle. The alert message may be in the form of a popup dialog or may be sent in the form of an email or text message or other similar alert mechanism. The user interface 422 may be presented on a display of the computing device 420, and may provide a list of stores or a map with the geographic locations of the stores emphasized. The stores may be emphasized using some form of marking such as pins. The user interface may provide contact information, store hours, directions or other information to help facilitate the replacement of object 405A. As shown in FIG. 4, computing device 420 is a mobile device. However, in other examples computing device 420 may be a cloud computing device, web platform, server, desktop, laptop or other similar computing device.

In an alternate example, when the fluid-level sensor indicates the object's contents are low, the inventory processing module may facilitate direct online ordering. Such direct online ordering may occur in response to the electronic display device transmitting the first message to the application that the object is nearly empty. In addition, the commuting device 420 may offer to scan an identifier to purchase a new object. In one example, the inventory processing module may receive the input of a code from a shipment of a case of objects into a computing device. The input may be accomplished through manually entering a code, scanning or taking a picture of a barcode, QR code, or other commercial code. Optionally, the input may be done to a website instead of an application. Processing done by the computing device 420 may monitor the level of the contents or the number of objects left. Messages may be transmitted to the computing device 420 to indicate that the object level is low and to get a new object ready.

Additionally, when the shipment is about to run out (e.g., only one or two objects remain) a message may be displayed on computing device to order more. Optionally, the message may include an offer to send the order request directly to a distributor to provide another shipment. Thus, reducing the hassle of taking stock and ordering. In one example, the application may further assist in inventory management or serve as a software inventory reader. For example, the application may compile and display additional information, such as how long it took to go through a shipment for a particular beverage, how many objects are left, etc. Thereby assisting a user in determining demand.

As shown by object 405B, electronic display device 410B may also utilize the fluid level to determine whether the object is full (e.g., un-opened). This may be accomplished by comparing fluid level 460B with the fluid level of a full object, which may be a pre-configured level associated with the object. When the electronic display device 410B determines the bottle is still full the electronic display device 410B may generate one or more notifications. The notification may be similar to the notifications discussed above, however the textual message may attempt to elicit a response from a user (e.g., consumer). For example, the textual message may be "Open Me" or "I am lonely," "Don't Forget About Me" or other similar message.

As shown with object 405C, the electronic display device 410C may also utilize the fluid level sensor to determine whether the bottle has remained at the same level for an extended period of time at which point it may generate a notification to encourage consumption. The electronic display device 410C may be configured with a timer mechanism that checks the fluid level at a predetermined duration of time, for example, it may check fluid level 460C every hour, 24 hours, week, month or other similar duration of time. The electronic display device 410C may also be capable of storing fluid level 460C at different points in time and comparing them to subsequent fluid levels to determine whether the fluid level has change during the duration of time. When the electronic display device 410C determines that the fluid level has not changed it may generate a notification. The notification may be similar to those discussed above and may include a textual message such as display message 413C (i.e., "Drink Me, It's Been 24 Hrs") or other similar message that displays the duration of time since fluid level 460C has changed. In other examples, the electronic display device 410C may utilize motion sensors (e.g., accelerometers, gyroscopes) in combination with, or as an alternative to, the fluid level sensor in order to determine whether the bottle has remained at the same fluid level (e.g., remained unused).

Multiple electronic display devices may be configured by a single computing device. As shown in FIG. 4, multiple electronic display devices 410A-C may each be connected to computing device 420, and may be configured by computing device 420 to function as requested by a user. In one example, a user may modify the configuration settings of multiple electronic display devices 410A-C and with a single action may push the settings to each of the electronic display devices 410A-C. In another example, computing device 420 may modify the configurations while disconnected from the electronic display device 410A-C, and after the user has completed the modifications may subsequently connect to the electronic display devices to push the configurations to the respective electronic display devices 410A-C.

In an alternate example, the electronic display devices 410A-C may communicate with one another in a peer-to-peer manner. This may allow computing device 420 to communicate with electronic device 410B through electronic display device 410A without connecting directly to electronic display device 410B. Computing device 420 may utilize this feature to configure multiple bottles by pushing the configurations to one electronic display device (e.g., 410A) and that electronic display device may function as a hub and push the configurations to each of the other electronic display devices (e.g., 410B and 410C). In another example, the electronic display devices may be configured to be daisy chained such that an electronic display device may route messages between other electronic display devices without the other electronic display devices being directly connected. For example, object 405A may communicate with object 405C by sending messages through object 405B.

In an alternative example, the objects may communicate with one another by communicating through the communication device, for example object 405A communicates to object 405B by sending messages from object 405A to computing device 420 which sends (e.g., forwards) the messages to object 405B. In another example, object 405A may send other information such as viral messages, images, advertisements etc. to one or more of the other objects 405B and 405C.

FIGS. 5-8 depict flow charts of multiple illustrative examples of methods 500, 600, 700 and 800 (hereafter "methods") for receiving data from a sensor and providing messages to a user. Method 500 may include a high-level description of various operations whereas methods 600, 700 and 800 may include example methods discussing speech processing, proximity detection and inventory processing respectively. The methods and each of their individual functions, routines, subroutines, or operations may be performed by processing logic of the electric display device or computing device executing the method. The processing logic may include hardware, software, firmware, or a combination thereof. For example, processing logic may include a general purpose and/or special purpose processor that executes instructions for performing the methods. In certain implementations, the methods may be performed by a single processing thread. Alternatively, the methods may be performed by two or more processing threads, each thread executing one or more individual functions, routines, subroutines, or operations of the method. In an illustrative example, the processing threads implementing the methods may be synchronized (e.g., using semaphores, critical sections, and/or other thread synchronization mechanisms). Alternatively, the processes implementing the methods may be executed asynchronously with respect to each other.

Referring to method 500, at block 501, processing logic of an electronic display device or other electronic device may attach to an object and may receive data. The data may be gathered by a sensor device associated with or included in the electronic display device, and may be transmitted from the sensor device to a processing device of the electronic display device or other electronic device for subsequent processing.

At block 502, processing logic of the electronic display device or other electronic device may determine whether the data satisfies a criterion. The criterion may depend on the type of sensor device from which the data was received. In one example, the criterion may assess the quality or reliability of the sensor data. For example, if the sensor device is a microphone, the criterion may be satisfied if the sensor data includes a sufficient duration or quality of voice data for speech processing. In another example, the criterion may be a threshold. For example, if the sensor is a fluid level sensor, then the criterion may be a fluid level threshold that is satisfied if a detected fluid level is below the fluid level threshold. In another example, the sensor may be a motion sensor such as an accelerometer or gyroscope, and the criterion may be a match of a detected motion to a motion signature. If the criterion is not satisfied, the method may branch back to block 501 to continue receiving data. If the criterion is satisfied, the method may proceed to block 503.

At block 503, the processing logic may generate a first message based on the data and/or based on satisfaction of the criterion. The first message may include data gathered by the sensor device (e.g., raw data) or may include preprocessed data. The first message may also include a request for additional information based on data received by the sensor device.

At block 504, the processing logic of the electronic display device or other electronic device may transmit the first message to a computing device that is wirelessly connected to the electronic display device. The wireless connection is a connection that includes at least a portion that is wireless and does not require that both devices be directly wirelessly connected to each other (e.g., paired) or to a network. For example, a wireless connection may be a direct wireless connection between devices or it may be a wireless connection to an access point wherein some or all of the remaining portion of the communication path is wired. In one embodiment, the method further includes establishing the wireless connection to the computing device.

The operations of blocks 505-506 are applicable if the electronic device is an electronic display device. At block 505, the processing logic of the electronic display device may receive a second message from the computing device. In one example, the second message may include a response to a request included within the first message. In another example, the second message may include translated results corresponding to data included in the first message.

At block 506, the processing logic of the electronic display device may display at least one of the first message or the second message. The messages may include a textual message displayed by the visual display of the electronic display device. The message may be displayed as a rolling message that scrolls across the display or may be a flashing or static message. Responsive to completing the operations described herein above with references to block 506, the method may terminate.

Figure 6:
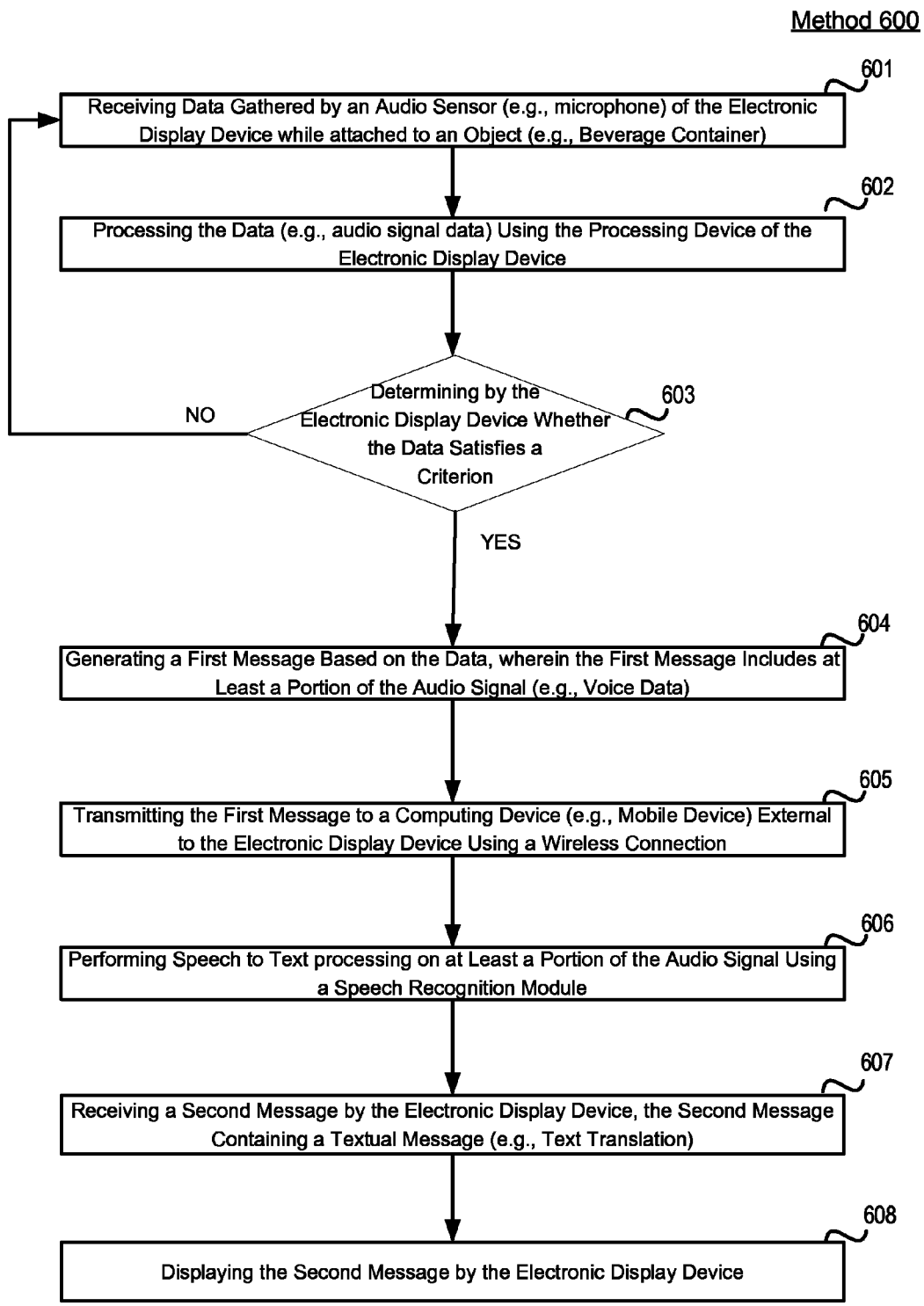
FIG. 6 is a flow chart of an example method for processing audio data into a textual message and displaying the textual message on a display of the electronic display device.

FIG. 6 is a flow chart of an example method 600 for processing audio data into a textual message and displaying the textual message on a visual display of the electronic display device. At block 601, the processing logic of the electronic display device may receive data gathered by an audio sensor (e.g., microphone) of the electronic display device while attached to an object (e.g., beverage container).

At block 602, the processing logic of the electronic display device may process the data (e.g., audio signal). The processing may include audio signal preprocessing discussed above, such as audio trimming, audio compression and tokenization.

At block 603, the processing logic of the electronic display device may determine whether the data satisfies a criterion. The criterion may include determining whether the data gathered by the microphone includes a form of voice data. This may involve processing an audio signal data to determine whether it reflects or is similar to an audio signature of voice data, as opposed to audio noise such as static, alarms, clapping or other non-voice audio data. The criterion may also ensure that the audio signal data is of sufficient length to perform speech to text recognition, for example, that the voice data exceeds a minimum threshold duration, such as 1 second, 2 seconds or some other similar duration of time. The criterion may also require that the audio signal data has a decibel level that exceeds a threshold decibel level. In one example, the threshold decibel level may be 20 decibels (dBs), 25 dBs, 30 dBs or other similar amount and audio signals below the threshold may not be considered voice data (and thus may not satisfy the criterion). When the audio signal data fails to satisfy the criterion, the method branches back to block 601 to receive additional data. When the audio signal data satisfies the criterion, the method may proceed to block 604.

At block 604, the processing logic of the electronic display device may generate a first message based on the data, wherein the first message includes at least a portion of the audio signal. In one example, the first message may include raw audio data gathered by the audio sensor. The raw audio data may be a continuous stream of audio information. In another example, the first message may include audio signal data that has been processed to trim non-voice data from the beginning and end of the audio signal and may remove non-voice data (e.g., pauses) between words.

At block 605, the processing logic of the electronic display device may transmit the first message to a computing device external to the electronic display device using a wireless connection. The computing device may perform speech to text processing on at least a portion of the audio signal using a speech recognition module as seen at block 606. The speech recognition module may produce a textual message that may be included within a second message.

At block 607, the processing logic of the electronic display device may receive the second message over the wireless connection. The second message may contain a textual message produced by the speech recognition module. In response to receiving the second message, the method may proceed to block 608.

At block 608, the processing logic of the electronic display device may display the textual message of the second message using the visual display of the electronic display device. Responsive to completing the operations described herein above with references to block 608, the method may terminate.

Figure 7:
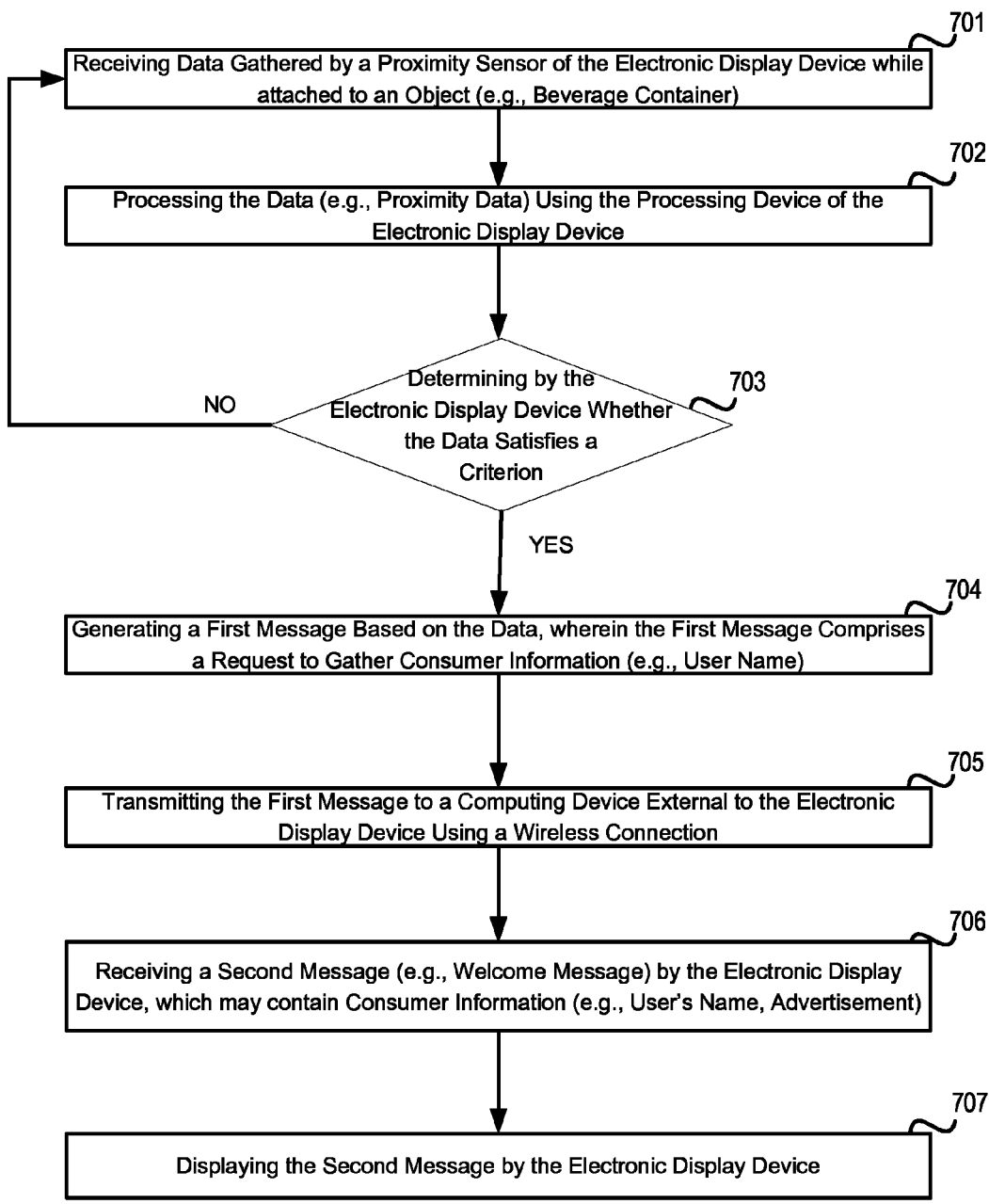
FIG. 7 is a flow chart of an example method for processing proximity sensor data and displaying a message on a display of the electronic display device.

FIG. 7 is a flow chart of an example method 700 for processing proximity sensor data and presenting (e.g., displaying, announcing) a message using the electronic display device. At block 701, the processing logic of the electronic display device may receive data gathered by a proximity sensor, motion sensor and/or communication module of the electronic display device while attached to an object (e.g., beverage container). For example, a motion sensor may gather data corresponding to motion of users near the object. Additionally, or alternatively, a wireless communication module may detect when a computing device of a user enters the vicinity of the object based on detecting wireless signals therefrom. At block 702, the processing logic of the electronic display device may process the data received by the proximity sensor, motion sensor and/or communication module. At block 703, the processing logic of the electronic display device may determine whether the data satisfies a criterion. The criterion may be whether the data represents a user (e.g., potential consumer) in the area. When analyzing data from a motion sensor this may involve distinguishing the motion of a user from other changes (e.g., lights turned on). When analyzing data from a wireless module this may include determining if the computing device of the user contains the appropriate program (e.g., application) and/or has a unique identifier corresponding to a unique identifier of a customer. For example, the electronic display device may store a list of unique identifiers of computing devices of customers, where each unique identifier is associated with a customer name. Processing logic may compare a unique identifier of a detected computing device to stored unique identifiers. If a match is found, then processing logic may determine that the customer associated with that unique identifier has been detected. When the processing logic of the electronic display determines the criterion is not satisfied, it may branch back to block 701 and gather additional data from the proximity sensor, motion sensor and/or communication module. When the processing logic determines the criterion is satisfied, it may proceed to block 704.

At block 704, the processing logic of the electronic display device may generate a first message based on the data. The first message may include a request to gather consumer information. The consumer information may include the name of the user, a birth date, age, favorite drink, demographic information or other personal information. The consumer information may also include user specified configuration settings associated with the user interface module, such as the user's personal greeting or other similar settings. This information may be stored by an application associated with the electronic display device that is installed and/or executing on the computing device.

At block 705, the processing logic of the electronic display device may transmit the first message to a computing device external to the object using a wireless connection. In response to receiving the first message, the computing device may process the request by gathering the requested consumer information and including it within a second message (e.g., response), which may be sent back over the same wireless connection. In another example, the second message may also include advertisement material that is selected based on the consumer information.

At block 706, the processing logic of the electronic display device may receive the second message. The second message may include content for a welcome message. For example, the second message may include the user's name and the user's preferred personal greeting.

At block 707, the processing logic of the electronic display device may display the second message to a user. This may involve illuminating the visual display of the electronic display device with content of the second message (e.g., welcome message). The electronic display device may also announce the message using a speaker of the electronic display device. Responsive to completing the operations described herein above with references to block 707, the method may terminate.

Figure 8:
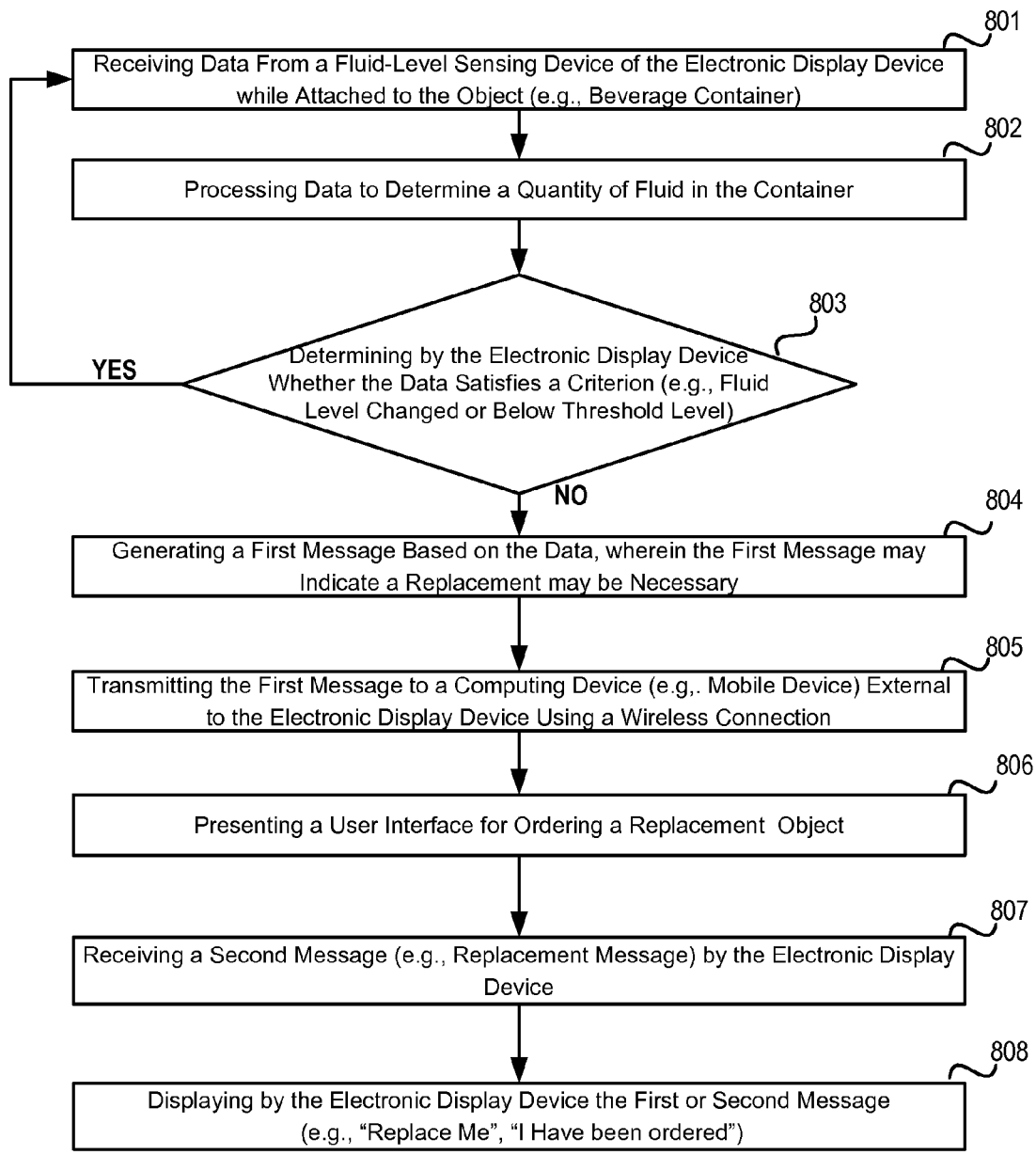
FIG. 8 is a flow chart of an example method for processing fluid sensing data and displaying a message on a display of the electronic display device.

FIG. 8 is a flow chart of an example method 800 for processing fluid-level sensor data and presenting (e.g., displaying, announcing) a message to a user using the electronic display device or other electronic device. At block 801, the processing logic of the electronic device may receive data gathered by a fluid-level sensor of the electronic display device. The fluid-level sensor may be used to monitor changes in the quantity of fluid in an object such as a bottle and may be implemented using a variety of different mechanisms such as a mechanical gyrator discussed above.

At block 802, the processing logic of the electronic device may process the data to determine a quantity of fluid contained within the object. At block 803, the processing logic of the electronic device may determine whether the data satisfies a criterion. In one example, the criterion may be whether the fluid level has changed. In another example, the criterion may be whether the fluid level is below a threshold level. When the fluid level does not satisfy the criterion (e.g., is not below the threshold level), the method may branch to block 801 and continue gathering data. When the fluid level satisfies the criterion (e.g., has dropped below the threshold level), the method may proceed to block 804.

At block 804, the processing logic of the electronic device may generate a first message based on the data gathered by the fluid-level sensor. In one example, the first message may indicate that a replacement is needed using an indicator variable. The indicator variable may be implemented using a binary value, wherein a true value may indicate the object should be replaced and a false value may indicate the bottle does not need to be replaced, or vice versa. In another example, the first message may include the changed fluid-level and the processing logic of the computing device may perform subsequent processing to compare the fluid-level to a threshold level to determine whether the object should be replaced. An indication of the determined fluid-level may be stored or communicated as, for example, a numeric value (e.g., integer value).

At block 805, the processing logic of the electronic device may transmit the first message to a computing device external to the object using a wireless connection, and in response to receiving the first message the computing device may process the first message.

At block 806, the processing logic of the computing device may have a user interface for ordering a replacement object. The user interface may include an alert such as an audio alert or a visual alert (e.g., popup message, banner message or icon badge). The user interface may enable the user to order a replacement object by displaying a map that marks one or more stores where a replacement may be purchased. It may also include the stores in a list with prices and contact information, which may be sorted based on price or distance.

The operations of blocks 807-808 are applicable if the electronic device is an electronic display device. At block 807, the processing device of the electric display device may receive a second message (e.g., a replacement message). The second message may have been generated by the remote computing device and may include a textual message.

At block 808, the processing logic of the electronic display device may display the second message to a user. This may involve illuminating the visual display with content of the second message (e.g., "Replace Me", "I Have Been Ordered"). The electronic display device may also announce the message using a speaker of the electronic display device. Responsive to completing the operations described herein above with references to block 808, the method may terminate.

In addition to the example systems and methods discussed above, the electronic display device or other electronic device attached to an object may also include other features. In one example, the electronic device may include a temperature sensor. The temperature sensor may monitor the temperature of the contents and report on the temperature to a remote computing device (e.g., a user's mobile device). If the electronic device is an electronic display device, it may display the temperature on the object.

In another example, the electronic display device may have different modes or settings that restrict who has access to modify the object (e.g., private, broadcast, etc.). The settings may be preprogrammed or controlled by the people who have possession of the bottles. For example, a private mode may be enabled by a couple having a private dinner and would like control over the object without other parties displaying messages on their object. In another example, the broadcast mode may be used in various situations (e.g., at sporting events, social gatherings, bars, or other similar events) to show messages, run contests, advertisements, or other similar uses.

In some examples, the electronic display device or other electronic device may allow instructions to be provided or programmed or to receive the input of a message to be shown on the display. An input device of the electronic display device may include an off switch to turn off the display, enter buttons (or other input buttons), alphanumeric characters (e.g., all letters and numbers), and other similar inputs. Other embodiments may include characters for various languages. Alternatively, the electronic display device may not include any buttons for inputting messages, and may rely on communication with an application for programming new messages. For example, an application installed on a mobile computing device may include an interface (e.g., a keyboard shown in a touchscreen) for inputting characters to generate a message. Once a message has been generated at a computing device, the computing device may send the message to the electronic display device for storage and later display. Additionally, the application running on the computing device may include an audio recording option, and may record an audio input. This audio input may be sent to the electronic display device and later output via speakers of the electronic display device. The audio recording may be output together with, or separate from, a text message.

In one example, first electronics of the electronic display device may include a receiver, transmitter, processor, and power source, which may be separate from a display portion of the electronic display device. For example, the first electronics may be located on the bottom of an object while the display portion is located on a side of the object. Other locations may also be used, such as a groove or indention on the object. The electronics may be sealed to prevent moisture from interfering or degrading operation.

In another example, a platform or base may identify and connect to multiple containers or objects. Exemplary platforms may include shelves, counters, table tops, coasters, bar shelves, or other similar platforms for display or storage of beverage objects. In such a scenario, the platform or base may serve as a central control system to synchronize the displays of the containers or objects such that they may serve as a single synchronized display. For example, if five objects are placed in a row, a message or image may scroll from the display across all objects rather than a single object. The platform may also take into account the position of the objects such that the display proceeds uninterrupted. For example, only showing the message or image across the viewable portion of the display and not the portion hidden by a curve of the object or identifying when an object is removed and continuing the message or image across the remaining objects and omitting the removed object.

In another example, the platform may serve as a charging station for the containers placed on or within it. Such a charging station may operate on wired connection to the containers or wireless charging through induction.

The platform or base may, through proximity sensors or transceivers, identify and connect to containers or objects placed on or married to it. For example, a coaster serving as a base may identify a specific container or object placed upon it. The base may then transmit images to the object or assist in connecting the object to other objects.

Figure 9:
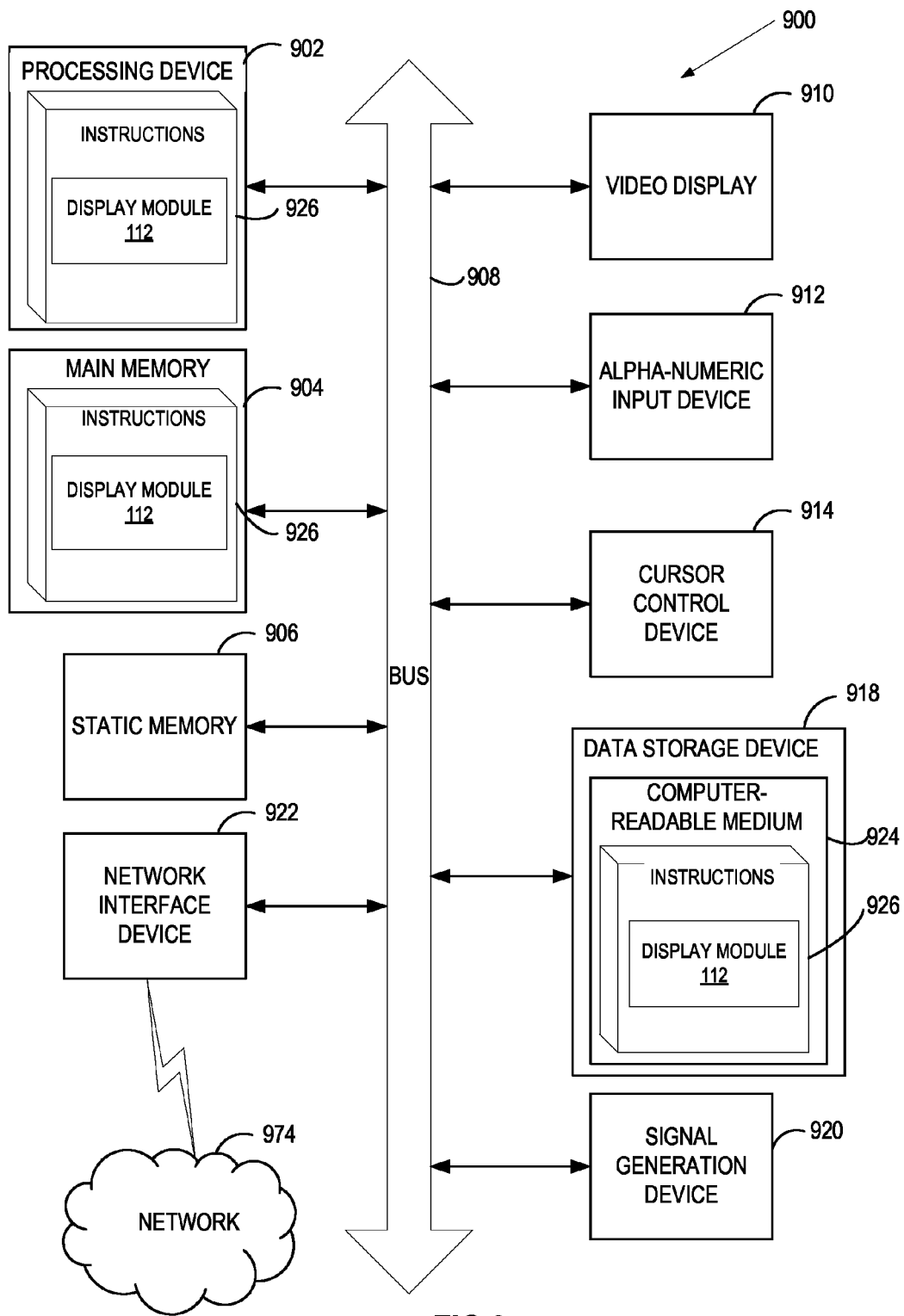
FIG. 9 is a block diagram depicting an example system architecture, in accordance with an example of the present application.

In an optional example, the platform or base may also project a holographic or three dimensional image within the object or off the object similar to methods described above. The holographic or other three-dimensional image may appear to a user as being enclosed by the bottle. In such an embodiment, the holographic or three dimensional image may be projected from the base of the bottle. In other embodiments, the holographic or three dimensional image may be projected to the interior of the bottle surface. In yet other embodiments, the holographic or three dimensional image may appear to a viewer as appearing outside the bottle surface. In all embodiments, the holographic or three dimensional image may be static or dynamic FIG. 9 depicts a block diagram of a computer system operating in accordance with one or more aspects of the present disclosure. In various illustrative examples, computer system 900 may correspond to electronic display device 110 or computing devices 120A or 120B of FIG. 1.

In certain implementations, computer system 900 may be connected (e.g., via a network, such as a Local Area Network (LAN), an intranet, an extranet, or the Internet) to other computer systems. Computer system 900 may operate in the capacity of a server or a client computer in a client-server environment, or as a peer computer in a peer-to-peer or distributed network environment. Computer system 900 may be provided by a personal computer (PC), a tablet PC, a set-top box (STB), a Personal Digital Assistant (PDA), a cellular telephone, a web appliance, a server, a network router, switch or bridge, an electronic display device, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 900 may include a processing device 902, a volatile memory 904 (e.g., random access memory (RAM)), a non-volatile memory 906 (e.g., read-only memory (ROM) or electrically-erasable programmable ROM (EEPROM)), and/or a data storage device 916, which may communicate with each other via a bus 908.

Processing device 902 may be provided by one or more processing devices such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 900 may further include a network interface device 922 (e.g., a wireless communication module, wireless modem, etc.). Computer system 900 also may include a video display unit 910 (e.g., an LCD), an alphanumeric input device 912 (e.g., a keyboard), and a cursor control device 914 (e.g., a mouse).

Data storage device 916 may include a non-transitory computer-readable storage medium 924 on which it may store instructions 926 encoding any one or more of the methods or functions described herein, including instructions encoding electronic display device 110 of FIG. 1 to implement methods 500, 600, 700 or 800 for providing (e.g., displaying, announcing) messages to users.

Instructions 926 may also reside, completely or partially, within main memory 904 and/or within processing device 902 during execution thereof by computer system 900, hence, main memory 904 and processing device 902 may also constitute machine-readable storage media.

While computer-readable storage medium 924 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer or device that cause the computer or device to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and software components, or only in software.

Unless specifically stated otherwise, terms such as "receiving", "identifying", "determining", "transmitting", "displaying", or the like, refer to actions and processes performed or implemented by a computer system that manipulates and transforms data represented as physical (electronic) quantities within the computer system registers and memories into other data similarly represented as physical quantities within the computer system memories or registers or other such information storage or display devices. Also, the terms "first," "second," "third," "fourth,"

etc. as used herein are meant as labels to distinguish among different elements and may not necessarily have an ordinal meaning according to their numerical designation.

Examples described herein also relate to an apparatus for performing the methods described herein. This apparatus may be specially constructed for performing the methods described herein, or it may include a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 500, 600, 700, 800 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
   receiving data by an electronic display device attached to an object, the data comprising an audio signal containing voice data recorded by a microphone of the electronic display device;
   determining, by the electronic display device, whether the data satisfies a criterion;
   responsive to determining that the data satisfies the criterion, generating a first message based on the data;
   wirelessly transmitting the first message to a computing device that is wirelessly connected to the electronic display device;
   receiving a second message from the computing device; and
   displaying, by the electronic display device, text from at least one of the first message or the second message, the text being derived from the audio signal recorded by the microphone of the electronic display device.

2. The method of claim 1, wherein the first message comprises at least a portion of the audio signal, and wherein the second message comprises a textual message generated by at least one of the computing device or another computing device based on performing speech to text processing on at least the portion of the audio signal.

3. The method of claim 1, further comprising:
   processing the audio signal by the electronic display device;
   determining that the audio signal comprises a voice command based on the processing; and
   performing an operation responsive to the voice command.

4. The method of claim 1, wherein the object is a container, wherein the data comprises measurement information generated by a sensor of the electronic display device, the measurement information indicating a quantity of a fluid in the container, wherein the criterion comprises a quantity threshold, wherein determining whether the data satisfies the criterion comprises determining whether the quantity of the fluid in the container is below the quantity threshold, and wherein the first message and the second message indicate that the quantity of the fluid is below the quantity threshold.

5. The method of claim 1, wherein the computing device is a mobile device executing an application for communicating with the electronic display device, wherein the data comprises a signal from the computing device, wherein the criterion comprises a proximity threshold, wherein determining whether the data satisfies the criterion comprises determining whether the computing device is within the proximity threshold based on the signal, and wherein the second message comprises an identification of a user associated with the computing device.

6. The method of claim 5, wherein the first message comprises at least one of a welcome message or an advertisement directed to the user, at least one of the welcome message or the advertisement to be displayed on the electronic display device by the application.

7. The method of claim 1, wherein the data comprises inventory information indicating a quantity of objects, wherein the criterion comprises a quantity threshold, wherein determining whether the data satisfies the criterion comprises determining whether the quantity of objects is below the quantity threshold, and wherein the first message comprises a recommendation to order additional objects.

8. A non-transitory computer readable storage medium comprising instructions to cause a processor to:
   receive data by an electronic display device attached to an object, the data comprising an audio signal containing voice data recorded by a microphone of the electronic display device;
   determine, by the electronic display device, whether the data satisfies a criterion;
   generate a first message based on the data in response to determining that the data satisfies the criterion;
   wirelessly transmit the first message to a computing device that is wirelessly connected to the electronic display device;
   receive a second message from the computing device; and
   display, by the electronic display device, text from at least one of the first message or the second message, the text being derived from the audio signal recorded by the microphone of the electronic display device.

9. The non-transitory computer readable storage medium of claim 8, wherein the first message comprises at least a portion of the audio signal, and wherein the second message comprises a textual message generated by at least one of the computing device or another computing device based on performing speech to text processing on at least the portion of the audio signal.

10. The non-transitory computer readable storage medium of claim 8, wherein the processor further to:
    process the audio signal by the electronic display device;
    determine that the audio signal comprises a voice command based on the processing; and
    perform an operation responsive to the voice command.

11. The non-transitory computer readable storage medium of claim 8, wherein the object is a container, wherein the data comprises measurement information generated by a sensor of the electronic display device, the measurement information indicating a quantity of a fluid in the container, wherein the criterion comprises a quantity threshold, wherein determining whether the data satisfies the criterion comprises determining whether the quantity of the fluid in the container is below the quantity threshold, and wherein the first message and the second message indicate that the quantity of the fluid is below the quantity threshold.

12. The non-transitory computer readable storage medium of claim 8, wherein the computing device is a mobile device executing an application for communicating with the electronic display device, wherein the data comprises a signal from the computing device, wherein the criterion comprises a proximity threshold, wherein determining whether the data satisfies the criterion comprises determining whether the computing device is within the proximity threshold based on the signal, and wherein the second message comprises an identification of a user associated with the computing device.

13. The non-transitory computer readable storage medium of claim 12, wherein the first message comprises at least one of a welcome message or an advertisement directed to the user, at least one of the welcome message or the advertisement to be displayed on the computing device by the application.

14. The non-transitory computer readable storage medium of claim 8, wherein the data comprises inventory information indicating a quantity of objects, wherein the criterion comprises a quantity threshold, wherein determining whether the data satisfies the criterion comprises determining whether the quantity of objects is below the quantity threshold, and wherein the first message comprises a recommendation to order additional objects.

* * * * *